(12) United States Patent
Sanchez et al.

(10) Patent No.: US 12,290,751 B2
(45) Date of Patent: May 6, 2025

(54) SYSTEMS AND METHODS FOR GENERATING VIRTUAL MAPS IN VIRTUAL GAMES

(71) Applicant: BlueOwl, LLC, San Francisco, CA (US)

(72) Inventors: Kenneth Jason Sanchez, San Francisco, CA (US); Micah Wind Russo, Oakland, CA (US)

(73) Assignee: QUANATA, LLC, San Francisco, CA (US)

( * ) Notice: Subject to any disclaimer, the term of this patent is extended or adjusted under 35 U.S.C. 154(b) by 92 days.

(21) Appl. No.: 17/404,158

(22) Filed: Aug. 17, 2021

(65) Prior Publication Data

US 2023/0057816 A1    Feb. 23, 2023

(51) Int. Cl.
*A63F 13/65* (2014.01)
*A63F 13/5378* (2014.01)

(52) U.S. Cl.
CPC .......... *A63F 13/65* (2014.09); *A63F 13/5378* (2014.09); *A63F 2300/69* (2013.01)

(58) Field of Classification Search
CPC ... A63F 13/65; A63F 13/5378; A63F 2300/69
See application file for complete search history.

(56) References Cited

U.S. PATENT DOCUMENTS 6,726,567 B1    4/2004   Khosla
7,278,920 B1 *  10/2007  Klamer ................ A63F 13/27
                                                463/31

(Continued)

FOREIGN PATENT DOCUMENTS

CN    105718065 A    6/2016
CN    107543554 A    1/2018

(Continued)

OTHER PUBLICATIONS

Vibhor Rastogi (Virtual Reality Based Simulation Testbed for Evaluation of Autonomous Vehicle Behavior Algorithms, Clemson University, 2017, pp. 1-69) (Year: 2017).

(Continued)

*Primary Examiner* — Seng H Lim

(74) *Attorney, Agent, or Firm* — BRYAN CAVE LEIGHTON PAISNER LLP

(57) ABSTRACT

Method and system for generating virtual maps. For example, the method includes determining first real-world driving characteristics based upon first real-world telematics data of a first real-world user, determining first real-world geolocation characteristics based upon first real-world geolocation data of the first real-world user, generating a first virtual map based upon the first real-world driving characteristics and the first real-world geolocation characteristics, presenting the first virtual map in a virtual game, determining second real-world driving characteristics based upon second real-world telematics data of a second real-world user, determining second real-world geolocation characteristics based upon second real-world geolocation data of the second real-world user, generating a second virtual map based upon the second real-world driving characteristics and the second real-world geolocation characteristics, and presenting the second virtual map in the virtual game.

20 Claims, 8 Drawing Sheets

(56) References Cited

U.S. PATENT DOCUMENTS

| | | |
|---|---|---|
| 8,645,029 B2 | 2/2014 | Kim et al. |
| 8,799,035 B2 | 8/2014 | Coleman et al. |
| 9,140,567 B2 | 9/2015 | Fryer et al. |
| 9,327,189 B2 | 5/2016 | Bavitz et al. |
| 9,352,216 B2 | 5/2016 | Mullen |
| 9,373,203 B1 | 6/2016 | Fields et al. |
| 9,381,426 B1 | 7/2016 | Hughes et al. |
| 9,473,893 B2 | 10/2016 | Kuramura et al. |
| 9,478,150 B1 | 10/2016 | Fields et al. |
| 9,498,704 B1 | 11/2016 | Cohen et al. |
| 9,586,591 B1 | 3/2017 | Fields et al. |
| 9,643,089 B2 | 5/2017 | Ishikawa et al. |
| 9,691,298 B1 | 6/2017 | Hsu-Hoffman et al. |
| 9,754,425 B1 | 9/2017 | Iqbal et al. |
| 9,786,170 B2 | 10/2017 | Roy et al. |
| 9,858,832 B1 | 1/2018 | Hsu-Hoffman et al. |
| 9,892,573 B1 | 2/2018 | Hsu et al. |
| 9,916,693 B1* | 3/2018 | Carr ................... G06T 11/206 |
| 9,943,754 B2* | 4/2018 | Prasad ................... A63F 13/25 |
| 10,013,883 B2 | 7/2018 | Farnham et al. |
| 10,055,794 B1 | 8/2018 | Konrardy et al. |
| 10,086,287 B2 | 10/2018 | Krietzman et al. |
| 10,127,570 B1 | 11/2018 | Cote et al. |
| 10,181,238 B2 | 1/2019 | Hate |
| 10,262,375 B1 | 4/2019 | Howard |
| 10,282,786 B1 | 5/2019 | Osborne et al. |
| 10,282,911 B2* | 5/2019 | Carr ................... G06T 19/006 |
| 10,360,576 B1 | 7/2019 | Hsu-Hoffman |
| 10,369,472 B1* | 8/2019 | Mattar ................... A63F 13/35 |
| 10,384,130 B2 | 8/2019 | Parisi |
| 10,403,043 B2 | 9/2019 | Kaufman et al. |
| 10,430,745 B2 | 10/2019 | Rani et al. |
| 10,445,758 B1 | 10/2019 | Bryer et al. |
| 10,521,983 B1 | 12/2019 | Hsu-Hoffman et al. |
| 10,557,715 B2 | 2/2020 | Caldas et al. |
| 10,603,591 B1* | 3/2020 | Navulur ................ A63F 13/655 |
| 10,617,938 B2 | 4/2020 | Chen et al. |
| 10,681,181 B2 | 6/2020 | Hamill |
| 10,703,378 B1 | 7/2020 | Russo et al. |
| 10,713,543 B1 | 7/2020 | Skuin et al. |
| 10,723,312 B1 | 7/2020 | Potter et al. |
| 10,737,184 B2 | 8/2020 | Baszucki |
| 10,775,179 B1 | 9/2020 | Hayward |
| 10,782,699 B2 | 9/2020 | Tao et al. |
| 10,788,332 B2 | 9/2020 | Deluca et al. |
| 10,831,207 B1 | 11/2020 | Leung et al. |
| 10,832,593 B1 | 11/2020 | Dahl et al. |
| 10,885,539 B1 | 1/2021 | Purgatorio et al. |
| 10,915,964 B1 | 2/2021 | Purgatorio et al. |
| 10,916,075 B1* | 2/2021 | Webster ............... G09B 19/167 |
| 11,037,382 B2 | 6/2021 | Lei et al. |
| 11,504,622 B1* | 11/2022 | Sanchez ............... A63F 13/216 |
| 11,697,069 B1* | 7/2023 | Sanchez ................. A63F 13/65 |
| | | 463/31 |
| 2001/0006908 A1 | 7/2001 | Fujioka et al. |
| 2002/0028704 A1 | 3/2002 | Bloomfield et al. |
| 2002/0070916 A1 | 6/2002 | Noro et al. |
| 2002/0075286 A1 | 6/2002 | Yonezawa et al. |
| 2002/0082068 A1 | 6/2002 | Singhal |
| 2002/0082082 A1 | 6/2002 | Stamper et al. |
| 2002/0090985 A1 | 7/2002 | Tochner et al. |
| 2002/0178033 A1 | 11/2002 | Yoshioka et al. |
| 2002/0198055 A1 | 12/2002 | Bull et al. |
| 2003/0062675 A1 | 4/2003 | Noro et al. |
| 2003/0144047 A1 | 7/2003 | Sprogis |
| 2003/0224855 A1 | 12/2003 | Cunningham |
| 2004/0005927 A1 | 1/2004 | Bonilla et al. |
| 2004/0046655 A1 | 3/2004 | Benes et al. |
| 2004/0058732 A1 | 3/2004 | Piccionelli |
| 2004/0224740 A1 | 11/2004 | Ball et al. |
| 2004/0248653 A1 | 12/2004 | Barros et al. |
| 2004/0259059 A1 | 12/2004 | Aoki et al. |
| 2005/0009608 A1 | 1/2005 | Robarts et al. |
| 2005/0049022 A1 | 3/2005 | Mullen |
| 2006/0105838 A1 | 5/2006 | Mullen |
| 2006/0154710 A1 | 7/2006 | Serafat |
| 2006/0258420 A1 | 11/2006 | Mullen |
| 2007/0257804 A1 | 11/2007 | Gunderson et al. |
| 2007/0281765 A1 | 12/2007 | Mullen |
| 2007/0281766 A1 | 12/2007 | Mullen |
| 2007/0296723 A1 | 12/2007 | Williams |
| 2008/0015018 A1 | 1/2008 | Mullen |
| 2008/0015024 A1 | 1/2008 | Mullen |
| 2008/0081694 A1 | 4/2008 | Hong et al. |
| 2008/0280684 A1 | 11/2008 | McBride et al. |
| 2008/0309675 A1 | 12/2008 | Fleury et al. |
| 2009/0005140 A1* | 1/2009 | Rose ..................... A63F 13/216 |
| | | 463/40 |
| 2009/0076784 A1 | 3/2009 | Ong et al. |
| 2010/0205012 A1 | 8/2010 | McClellan |
| 2010/0227688 A1 | 9/2010 | Lee et al. |
| 2010/0271367 A1 | 10/2010 | Vaden et al. |
| 2011/0090075 A1* | 4/2011 | Armitage ............. G07C 5/0816 |
| | | 340/439 |
| 2011/0212766 A1 | 9/2011 | Bowers et al. |
| 2011/0319148 A1 | 12/2011 | Kinnebrew et al. |
| 2012/0052953 A1 | 3/2012 | Annambhotla et al. |
| 2012/0069131 A1* | 3/2012 | Abelow ............. G06Q 30/0601 |
| | | 345/589 |
| 2012/0072241 A1 | 3/2012 | Krause et al. |
| 2012/0142429 A1 | 6/2012 | Muller |
| 2012/0185282 A1 | 7/2012 | Gore et al. |
| 2013/0090821 A1 | 4/2013 | Abboud et al. |
| 2013/0164715 A1 | 6/2013 | Hunt et al. |
| 2013/0182116 A1 | 7/2013 | Arima |
| 2013/0268156 A1 | 10/2013 | Schumann et al. |
| 2013/0311250 A1 | 11/2013 | Hickethier et al. |
| 2014/0125678 A1 | 5/2014 | Wang et al. |
| 2014/0128146 A1 | 5/2014 | Story et al. |
| 2014/0129130 A1* | 5/2014 | Kuramura .......... G01C 21/3874 |
| | | 455/456.3 |
| 2014/0180725 A1 | 6/2014 | Ton-That et al. |
| 2014/0195106 A1 | 7/2014 | McQuade et al. |
| 2014/0195272 A1* | 7/2014 | Sadiq ..................... G06Q 40/08 |
| | | 705/4 |
| 2014/0322674 A1 | 10/2014 | Livneh |
| 2014/0322676 A1 | 10/2014 | Raman |
| 2014/0347368 A1 | 11/2014 | Kishore et al. |
| 2014/0364238 A1 | 12/2014 | Koh et al. |
| 2015/0011315 A1* | 1/2015 | Sofman ................... A63F 13/65 |
| | | 463/31 |
| 2015/0081404 A1 | 3/2015 | Basir |
| 2015/0093722 A1 | 4/2015 | Fitzgerald et al. |
| 2015/0112504 A1* | 4/2015 | Binion ................... G07C 5/008 |
| | | 701/1 |
| 2015/0112540 A1 | 4/2015 | Rutkowski et al. |
| 2015/0120408 A1 | 4/2015 | Liu et al. |
| 2015/0178998 A1 | 6/2015 | Attard et al. |
| 2015/0187224 A1 | 7/2015 | Moncrief et al. |
| 2015/0212722 A1 | 7/2015 | Leung et al. |
| 2015/0294422 A1 | 10/2015 | Carver et al. |
| 2015/0310758 A1 | 10/2015 | Daddona et al. |
| 2016/0003636 A1 | 1/2016 | Ng-Thow-Hing et al. |
| 2016/0003836 A1 | 1/2016 | Stauber et al. |
| 2016/0084661 A1 | 3/2016 | Gautama et al. |
| 2016/0219024 A1 | 7/2016 | Verzun et al. |
| 2016/0371553 A1 | 12/2016 | Farnham et al. |
| 2017/0061733 A1 | 3/2017 | Gulla et al. |
| 2017/0089710 A1 | 3/2017 | Slusar |
| 2017/0259177 A1 | 9/2017 | Aghdaie et al. |
| 2017/0323244 A1* | 11/2017 | Rani ........................ G07C 5/02 |
| 2018/0247558 A1 | 8/2018 | Livneh |
| 2018/0286268 A1 | 10/2018 | Ni |
| 2018/0322700 A1* | 11/2018 | Carr ..................... G06F 16/9537 |
| 2018/0350144 A1 | 12/2018 | Rathod |
| 2019/0096134 A1 | 3/2019 | Amacker et al. |
| 2019/0108768 A1 | 4/2019 | Mohamed |
| 2019/0113927 A1 | 4/2019 | England et al. |
| 2019/0265703 A1 | 8/2019 | Hicok et al. |
| 2019/0384292 A1 | 12/2019 | Aragon et al. |
| 2020/0013306 A1 | 1/2020 | McQuade et al. |
| 2020/0050719 A1 | 2/2020 | Fuerstenberg et al. |
| 2020/0074266 A1 | 3/2020 | Peake et al. |
| 2020/0104326 A1 | 4/2020 | Ricci |

(56) References Cited

U.S. PATENT DOCUMENTS

| | | | |
|---|---|---|---|
| 2020/0139250 A1 | 5/2020 | Curtis et al. | |
| 2020/0286253 A1 | 9/2020 | Chilcote-Bacco | |
| 2020/0334762 A1 | 10/2020 | Carver et al. | |
| 2020/0357075 A1 | 11/2020 | Dahl | |
| 2020/0391104 A1* | 12/2020 | Nakamura | A63F 13/216 |
| 2021/0049925 A1 | 2/2021 | Robinson et al. | |
| 2021/0232632 A1 | 7/2021 | Howard | |
| 2021/0346805 A1 | 11/2021 | Daniali | |
| 2022/0242450 A1* | 8/2022 | Sokolov | B60W 60/0015 |
| 2022/0284077 A1* | 9/2022 | Dahl | G06F 30/20 |

FOREIGN PATENT DOCUMENTS

| | | |
|---|---|---|
| CN | 108253982 A | 7/2018 |
| CN | 108334090 A | 7/2018 |
| CN | 108446027 A | 8/2018 |
| CN | 109491394 A | 3/2019 |
| CN | 110427682 A | 11/2019 |
| CN | 210021183 U | 2/2020 |
| DE | 102013213179 A1 | 1/2015 |
| DE | 102018122864 A1 | 3/2020 |
| DE | 102019205083 A1 | 10/2020 |
| JP | 2014-181927 A | 9/2014 |
| KR | 10-2013-0107481 A | 10/2013 |
| WO | 2016/148753 A1 | 9/2016 |
| WO | 2019/245578 A1 | 12/2019 |
| WO | 2020/172634 A1 | 8/2020 |
| WO | 2020/181001 A1 | 9/2020 |

OTHER PUBLICATIONS

Ali et al., "Virtual Environment for Automobile Driving Test", In 2018 International Conference on Computing Sciences and Engineering (ICCSE), Mar. 2018, pp. 1-6.
Avouris et al., "A review of mobile location-based games for learning across physical and virtual spaces", J. UCS, vol. 18, No. 15, 2012, pp. 2120-2142.
Bozorgi et al., "A Time and Energy Efficient Routing Algorithm for Electric Vehicles Based on Historical Driving Data", IEEE Transactions on Intelligent Vehicles, vol. 2, No. 4, 2017, pp.
Bui et al., "The Effects of Gamification on Driver Behavior: An Example from a Free Float Carsharing Service", 2015.
Culík et al., "Creating a Virtual Environment for Practical Driving Tests", In International Conference on Transport Systems Telematics, 2019, pp. 95-108.
Dooren et al., "Rewards That Make You Play: the Distinct Effect of Monetary Rewards, Virtual Points and Social Rewards on Play Persistence in Substance Dependent and Non-Dependent Adolescents", In 2018 IEEE 6th International Conference on Serious Games and Applications for Health (SeGAH), May 2018, pp. pp. 1-7.
Esser et al., "Towards learning a realistic rendering of human behavior", In Proceedings of the European Conference on Computer Vision (ECCV), 2018, (pp. 0-0).
Handel et al., "Insurance telematics: Opportunities and challenges with the smartphone solution", IEEE Intelligent Transportation Systems Magazine, vol. 6, No. 4, 2014, pp. 57-70.
Helvaci et al., "Improving Driver Behavior Using Gamication", In International Conference on Mobile Web and Intelligent Information Systems, Aug. 2018, pp. 193-204.
Herrtwich et al., "Cooperative Driving: Taking Telematics to the Next Level", In Traffic and Granular Flow'01, 2003, pp. 271-280.
International Search Report and Written Opinion received for PCT Patent Application No. PCT/US2021/013911, mailed on Mar. 31, 2021, 9 pages.
International Search Report and Written Opinion received for PCT Patent Application No. PCT/US2021/013918, mailed on Apr. 8, 2021, 10 pages.
International Search Report and Written Opinion received for PCT Patent Application No. PCT/US2021/013928, mailed on Apr. 2, 2021, 8 pages.
International Search Report and Written Opinion received for PCT Patent Application No. PCT/US2021/013930, mailed on Apr. 23, 2021, 12 pages.
Lang et al., "Synthesizing Personalized Training Programs for Improving Driving Habits via Virtual Reality", In 2018 IEEE Conference on Virtual Reality and 3D User Interfaces, Mar. 2018, pp. 297-304.
Liu et al., "Two Techniques for Assessing Virtual Agent Personality", IEEE Transactions on Affective Computing, vol. 7, No. 1, May 19, 2015, pp. 94-105.
Lopez et al., "Using pervasive games as learning tools in educational contexts: a systematic review", International Journal of Learning Technology, vol. 13, No. 2, 2018, pp. 93-114.
Richter et al., "Studying Gamification: The Effect of Rewards and Incentives on Motivation", In Gamification in education and business, 2015, pp. 21-46.
Sha et al., "Social vehicle navigation: integrating shared driving experience into vehicle navigation", In Proceedings of the 14th workshop on mobile computing systems and applications, Feb. 2013, pp. 1-6.
Singh et al., "Real-time Collaboration Between Mixed Reality Users in Geo-referenced Virtual Environment", arXiv preprint arXiv, 2020, 2010.01023.
Stojaspal, Jan., "Gamification and telematics", available online at https://www.tu-auto.com/gamification-and-telematics/, 2013, 6 pages.
wiki.sc4devotion.com, SimCity 4 Encyclopaedia, "Tutorial: Understanding the Traffic Simulator", pp. 1-15. Retrieved from the Internet on Aug. 14, 2019: https://www.wiki.sc4devotion.com/index.php?title=Understanding_theTraffic_Simulator.
Wilken et al., "Maps and the Autonomous Vehicle as a Communication Platform", International Journal of Communication, vol. 13, 20'19, pp. 2703-2727.
"Drive Safe, Score Well: App Is A Driving 'Report Card'," by Lynn Jolicoeur and Sacha Pfeiffer, published Oct. 9, 2014. Source: https ://www.wbur.org/news/2014/10/09/safe-driving-app (Year: 2014).
"UK Telematics Online. Submitted articles relating to Vehicle Telematics," published Aug. 31, 2009. Source: https://web.archive.org/web/20090831075032/http://www.uktelematicsonline.co.uk/html/telematics_articles.html (Year: 2009).
Quinn, Nathan, "F1 2021 Drier Ratings Unveiled as Verstappen Equals Hamilton," Jul. 8, 2021 available at https://the-race.com/gaming/f1-2021-driver-ratings-unveiled-as-verstappen-equals-hamilton/#: - :text=Codemasters%20has %20decided %20the %20overall, their%20performances%20in%20real %2Dlife. (Year: 2021).

* cited by examiner

SYSTEMS AND METHODS FOR GENERATING VIRTUAL MAPS IN VIRTUAL GAMES

CROSS-REFERENCE TO RELATED APPLICATIONS

The following six applications, including this one, are being filed concurrently and the other five are hereby incorporated by reference in their entirety for all purposes:
1. U.S. patent application Ser. No. 17/404,139, titled "Systems and Methods for Generating Virtual Characters for a Virtual Game";
2. U.S. patent application Ser. No. 17/404,144, titled "Systems and Methods for Generating Virtual Experiences for a Virtual Game";
3. U.S. patent application Ser. No. 17/404,152, titled "Systems and Methods for Generating Virtual Encounters in Virtual Games";
4. U.S. patent application Ser. No. 17/404,158, titled "Systems and Methods for Generating Virtual Maps in Virtual Games";
5. U.S. patent application Ser. No. 17/404,164, titled "Systems and Methods for Generating Shared Virtual Maps in Virtual Games"; and
6. U.S. patent application Ser. No. 17/404,172, titled "Systems and Methods for Presenting Shared In-Game Objectives in Virtual Games".

FIELD OF THE DISCLOSURE

Some embodiments of the present disclosure are directed to generating virtual maps in a virtual game. More particularly, certain embodiments of the present disclosure provide methods and systems for generating the virtual maps using real-world telematics data and real-world geolocation data. Merely by way of example, the present disclosure has been applied to presenting the virtual maps for virtual characters in the virtual game. But it would be recognized that the present disclosure has much broader range of applicability.

BACKGROUND OF THE DISCLOSURE

While individuals generally exercise care while operating vehicles, it is still challenging for many vehicle operators to fully appreciate the risks associated with vehicle operations. As such, many vehicle operators may not be readily mindful of reducing such risks. Hence, it is highly desirable to develop new technologies that can increase a vehicle operator's appreciation and awareness of the risks posed by vehicle operation.

BRIEF SUMMARY OF THE DISCLOSURE

Some embodiments of the present disclosure are directed to generating virtual maps in a virtual game. More particularly, certain embodiments of the present disclosure provide methods and systems for generating the virtual maps using real-world telematics data and real-world geolocation data. Merely by way of example, the present disclosure has been applied to presenting the virtual maps for virtual characters in the virtual game. But it would be recognized that the present disclosure has much broader range of applicability.

According to certain embodiments, a method for generating one or more virtual maps in one or more virtual games includes receiving first real-world telematics data and first real-world geolocation data associated with one or more prior first real-world vehicle trips made by a first real-world user. Also, the method includes determining one or more first real-world driving characteristics based at least in part upon the first real-world telematics data and determining one or more first real-world geolocation characteristics based at least in part upon the first real-world geolocation data. Additionally, the method includes generating a first virtual map based at least in part upon the one or more first real-world driving characteristics and the one or more first real-world geolocation characteristics, where the first virtual map is generated for a first virtual character associated with the first real-world user. The method then includes presenting the first virtual map in a virtual game. Further, the method includes receiving second real-world telematics data and second real-world geolocation data associated with one or more prior second real-world vehicle trips made by a second real-world user. Also, the method includes determining one or more second real-world driving characteristics based at least in part upon the second real-world telematics data and determining one or more second real-world geolocation characteristics based at least in part upon the second real-world geolocation data. Additionally, the method includes generating a second virtual map based at least in part upon the one or more second real-world driving characteristics and the one or more second real-world geolocation characteristics, where the second virtual map is generated for a second virtual character associated with the second real-world user. The method then includes presenting the second virtual map in the virtual game. The first virtual map and the second virtual map are generated to be different in response to the one or more first real-world driving characteristics, the one or more second real-world driving characteristics, the one or more first real-world geolocation characteristics, and the one or more second real-world geolocation characteristics.

According to some embodiments, a computing device for generating one or more virtual maps in one or more virtual games includes one or more processors and a memory that stores instructions for execution by the one or more processors. The instructions, when executed, cause the one or more processors to receive first real-world telematics data and first real-world geolocation data associated with one or more prior first real-world vehicle trips made by a first real-world user. Also, the instructions, when executed, cause the one or more processors to determine one or more first real-world driving characteristics based at least in part upon the first real-world telematics data and determine one or more first real-world geolocation characteristics based at least in part upon the first real-world geolocation data. Additionally, the instructions, when executed, cause the one or more processors to generate a first virtual map based at least in part upon the one or more first real-world driving characteristics and the one or more first real-world geolocation characteristics, where the first virtual map is generated for a first virtual character associated with the first real-world user. The instructions, when executed, then cause the one or more processors to present the first virtual map in a virtual game. Further, the instructions, when executed, cause the one or more processors to receive second real-world telematics data and second real-world geolocation data associated with one or more prior second real-world vehicle trips made by a second real-world user. Also, the instructions, when executed, cause the one or more processors to determine one or more second real-world driving characteristics based at least in part upon the second real-world telematics data and determine one or more second real-world geolocation characteristics based at least in part upon the second real-world geolocation data. Additionally, the instructions, when executed, cause the one or more processors to generate a second virtual map based at least in part upon the one or more second real-world driving characteristics and the one or more second real-world geolocation characteristics, where the second virtual map is generated for a second virtual character associated with the second real-world user. The instructions, when executed, then cause the one or more processors to present the second virtual map in the virtual game. The first virtual map and the second virtual map are generated to be different in response to the one or more first real-world driving characteristics, the one or more second real-world driving characteristics, the one or more first real-world geolocation characteristics, and the one or more second real-world geolocation characteristics.

According to certain embodiments, a non-transitory computer-readable medium stores instructions for generating one or more virtual map in one or more virtual games. The instructions are executed by one or more processors of a computing device. The non-transitory computer-readable medium includes instructions to receive first real-world telematics data and first real-world geolocation data associated with one or more prior first real-world vehicle trips made by a first real-world user. Also, the non-transitory computer-readable medium includes instructions to determine one or more first real-world driving characteristics based at least in part upon the first real-world telematics data and determine one or more first real-world geolocation characteristics based at least in part upon the first real-world geolocation data. Additionally, the non-transitory computer-readable medium includes instructions to generate a first virtual map based at least in part upon the one or more first real-world driving characteristics and the one or more first real-world geolocation characteristics, where the first virtual map is generated for a first virtual character associated with the first real-world user. The non-transitory computer-readable medium then includes instructions to present the first virtual map in a virtual game. Further, the non-transitory computer-readable medium includes instructions to receive second real-world telematics data and second real-world geolocation data associated with one or more prior second real-world vehicle trips made by a second real-world user. Also, the non-transitory computer-readable medium includes instructions to determine one or more second real-world driving characteristics based at least in part upon the second real-world telematics data and determine one or more second real-world geolocation characteristics based at least in part upon the second real-world geolocation data.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to generating virtual maps in a virtual game. More particularly, certain embodiments of the present disclosure provide methods and systems for generating the virtual maps using real-world telematics data and real-world geolocation data. Merely by way of example, the present disclosure has been applied to presenting the virtual maps for virtual characters in the virtual game. But it would be recognized that the present disclosure has much broader range of applicability.

Figure 1A:
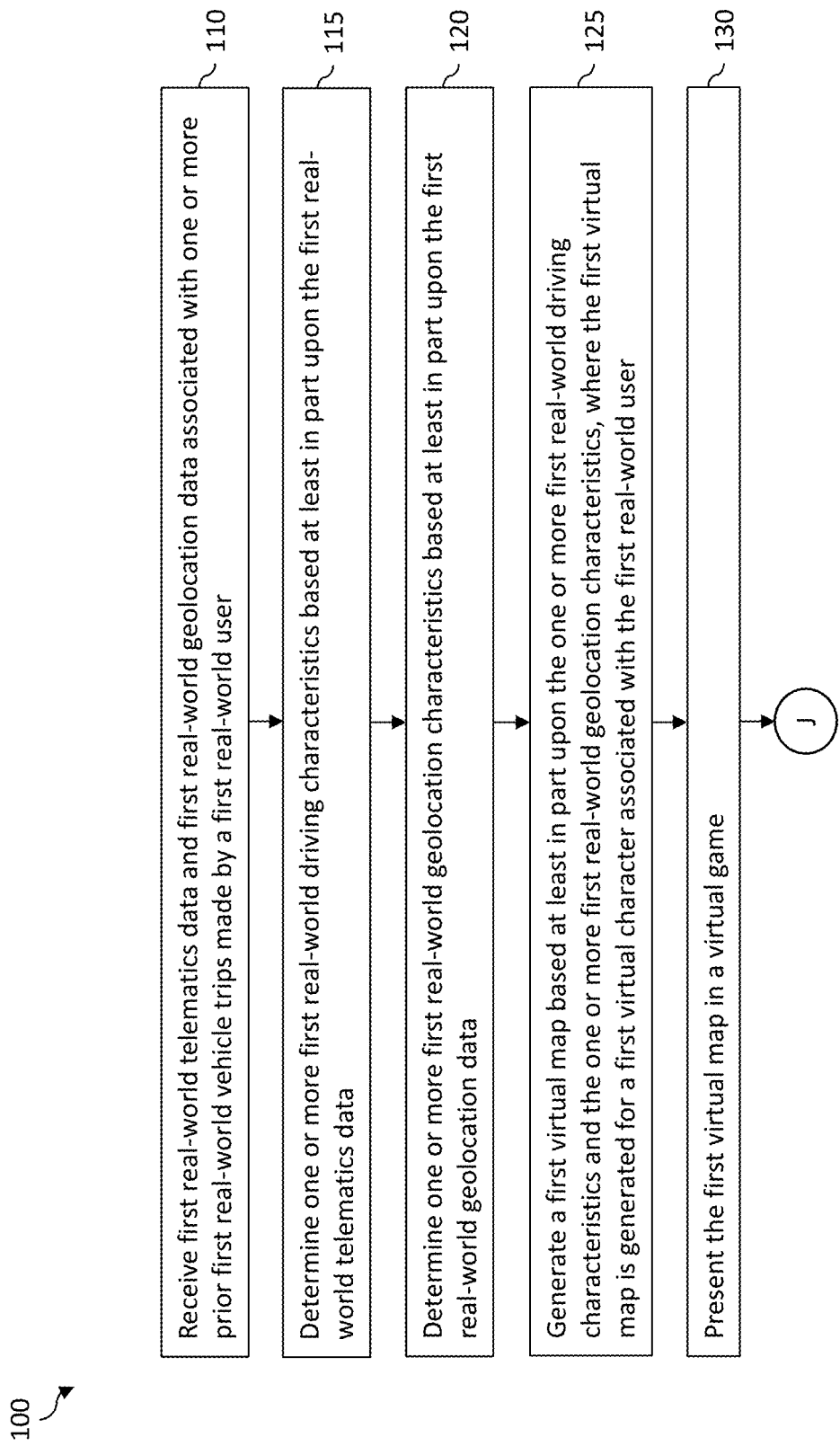
FIG. 1A and FIG. 1B show a simplified method for generating virtual maps in virtual games according to certain embodiments of the present disclosure.
Figure 1B:
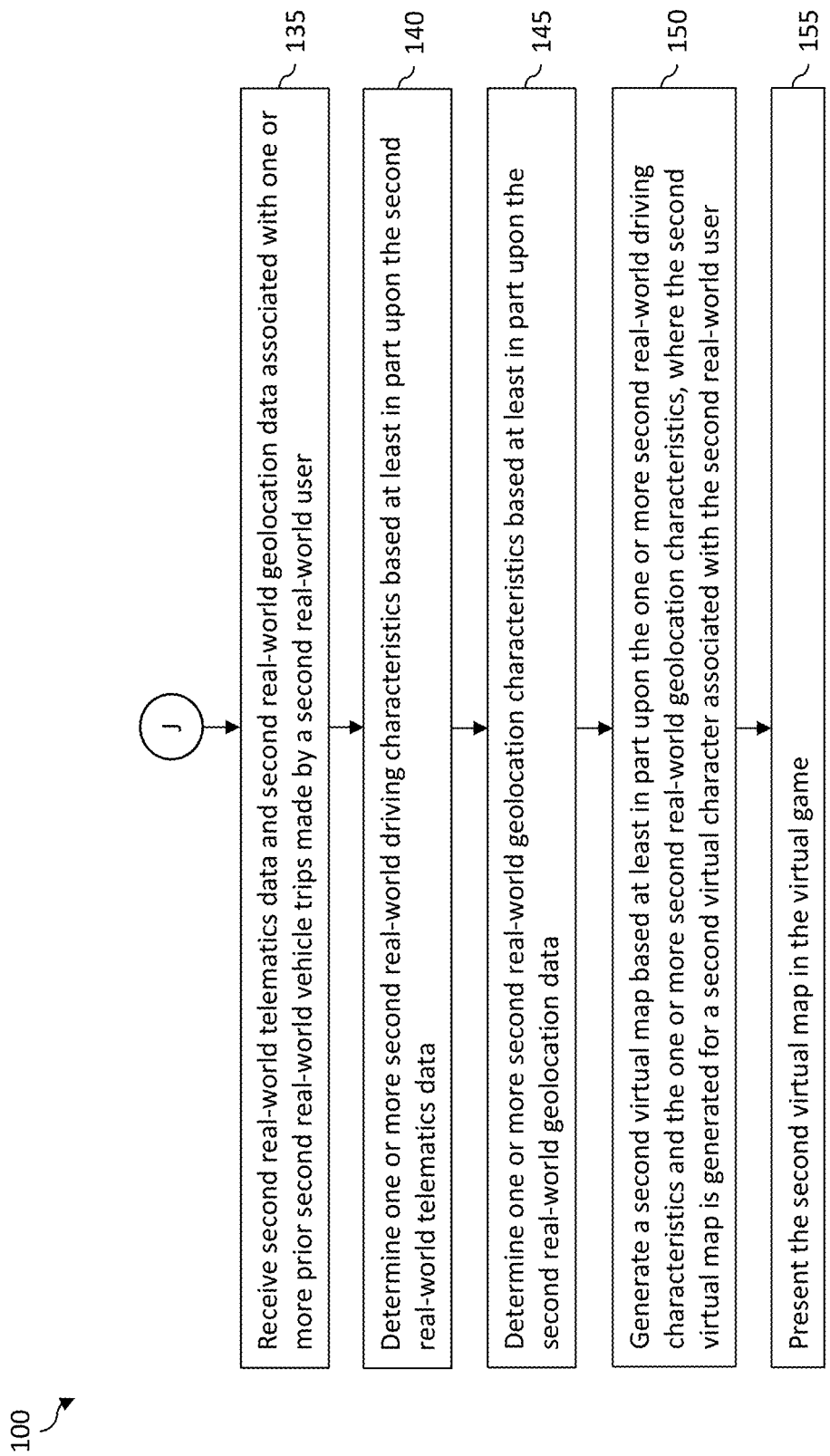

I. One or More Methods for Generating Virtual Maps in Virtual Games According to Certain Embodiments FIG. 1A and FIG. 1B show a simplified method for generating virtual maps in virtual games according to certain embodiments of the present disclosure. The figures are merely examples, which should not unduly limit the scope of the claims. One of ordinary skill in the art would recognize many variations, alternatives, and modifications. The method 100 includes process 110 for receiving first real-world data from a first real-world user, process 115 for determining first real-world driving characteristics, process 120 for determining first real-world geolocation characteristics, process 125 for generating a first virtual map, process 130 for presenting the first virtual map, process 135 for receiving second real-world data from a second real-world user, process 140 for determining second real-world driving characteristics, process 145 for determining second real-world geolocation characteristics, process 150 for generating a second virtual map, and process 155 for presenting the second virtual map. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 110, first real-world telematics data and first real-world geolocation data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. For example, the one or more prior first real-world vehicle trips include actual vehicle trips made by the first real-world user for any personal and/or business reasons (e.g., commuting to work, grocery shopping, going to a bank, road trips, etc.).

In some embodiments, the first real-world telematics data and/or the first real-world geolocation data are collected from one or more sensors associated with the first real-world vehicle operated by the first real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, etc. As an example, the first real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, etc. In certain embodiments, the one or more sensors are part of or located in the first real-world vehicle. For example, the one or more sensors communicate and store sensor data in an electronic control module (ECM) or an engine control unit (ECU) of the first real-world vehicle. In some embodiments, the one or more sensors are part of a computing device (e.g., a mobile device, a smart watch) that is connected to the first real-world vehicle. For example, the computing device is connected to the first real-world vehicle while the first real-world vehicle is in operation. As an example, the computing device is connected to the first real-world vehicle while the first real-world vehicle is stationary.

In certain embodiments, the first real-world telematics data indicate the operational state of the first real-world vehicle, such as speed, acceleration, braking event, etc. In some embodiments, the first real-world geolocation data indicate the physical locations of the first real-world vehicle. For example, the first real-world geolocation data include real-time GPS coordinates of the first real-world vehicle as the first real-world vehicle is in operation. As an example, the first real-world geolocation data include a first plurality of stopping points for the first real-world vehicle such as a starting location, an ending location, and one or more intermediate waypoint locations.

At the process 115, one or more first real-world driving characteristics are determined based at least in part upon the first real-world telematics data according to certain embodiments. In various embodiments, the one or more first real-world driving characteristics indicate how the first real-world user drives, such as how frequently the first real-world user drives, type of maneuvers that the first real-world user makes while driving (e.g., hard cornering, hard braking, sudden acceleration, smooth acceleration, slowing before turning, etc.), types of dangerous driving events (e.g., eating while driving, falling asleep while driving, etc.), types of safe driving events (e.g., maintaining safe following distance, turning on headlights, observing traffic lights, yielding to pedestrians, etc.), etc.

In some embodiments, the one or more first real-world driving characteristics refer to one or more driving skills of the first real-world user. For example, the one or more first real-world driving characteristics include a first braking characteristic, a first steering characteristic, and/or a first speeding characteristic. As an example, the first braking characteristic corresponds to the first real-world user's ability to decelerate the first real-world vehicle upon encountering braking obstacles (e.g., T-junctions, stop signs, pedestrian crossings, etc.). For example, the first steering characteristic corresponds to the first real-world user's ability to steer the first real-world vehicle upon encountering steering obstacles (e.g., potholes, road kills, sharp turns, etc.). As an example, the first speeding characteristic corresponds to the first real-world user's ability to decelerate the first real-world vehicle upon encountering speeding obstacles (e.g., approaching a school zone, entering city limit, etc.).

At the process 120, one or more first real-world geolocation characteristics are determined based at least in part upon the first real-world geolocation data according to certain embodiments. In various embodiments, the one or more first real-world geolocation characteristics indicate the type of area associated with the physical locations of the first real-world vehicle. For example, the first real-world vehicle may be traveling through a city, a suburb, a rural region, etc.

At the process 125, the first virtual map is generated based at least in part upon the one or more first real-world driving characteristics and the one or more first real-world geolocation characteristics according to some embodiments. In certain embodiments, the first virtual map is generated for a first virtual character associated with the first real-world user. In some embodiments, the first virtual map is a digital representation of the physical locations of the first real-world vehicle. In certain embodiments, the first virtual map includes landmarks that the first real-world user has visited while operating the first real-world vehicle. For example, the first virtual map may show virtual bridges corresponding to real-world bridges, virtual buildings corresponding to real-world buildings, virtual parks corresponding to real-world parks, etc.

In various embodiments, a first network of virtual roads are generated in the first virtual map based at least in part upon the one or more first real-world driving characteristics and the one or more first real-world geolocation characteristics. In certain embodiments, the one or more first real-world driving characteristics may include the first braking characteristic, the first steering characteristic, and/or the first speeding characteristic. For example, the first braking characteristic may indicate that the first real-world user brakes frequently while driving. As an example, the first network of virtual roads would include numerous virtual road intersections that correspond to the frequency of first real-world user's braking. For example, the first steering characteristic may indicate that the first real-world user makes sharp turns while driving. As an example, the first network of virtual roads would include virtual roads with a variety of curves/bends that correspond to the sharp turns made by the first real-world user. For example, the first speeding characteristic may indicate that the first real-world user often decelerates upon entering certain zones (e.g., a school zone). As an example, the first network of virtual roads would include appropriately spaced virtual traffic lights that correspond to the number of times that the first real-world user decelerates.

In some embodiments, the one or more first real-world geolocation characteristics may indicate that the first real-world user is operating the first real-world vehicle in an urban setting. For example, the first network of virtual roads would include various virtual city streets or highways that correspond to the urban setting.

At the process 130, the first virtual map is presented in a virtual game according to certain embodiments. For example, the first virtual map is presented in a remote display (e.g., in a mobile device of the first real-world user). In various embodiments, the virtual game simulates a virtual driving environment in which the first virtual character operates a first virtual vehicle. In certain embodiments, the first virtual character exists in the virtual game as a playable character for the first real-world user to control. For example, the first real-world user can direct the first virtual character to operate the first virtual vehicle in traversing the first network of virtual roads in the first virtual map.

At the process 135, second real-world telematics data and second real-world geolocation data associated with one or more prior second real-world vehicle trips made by the second real-world user are received according to some embodiments. In various embodiments, the second real-world user is a real-world driver of a second real-world vehicle. In certain embodiments, the one or more prior second real-world vehicle trips correspond to actual vehicle trips that the second real-world user has made in the past. For example, the one or more prior second real-world vehicle trips include actual vehicle trips made by the second real-world user for any personal and/or business reasons.

In some embodiments, the second real-world telematics data and/or the second real-world geolocation data are collected from one or more sensors associated with the second real-world vehicle operated by the second real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, etc. As an example, the second real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, etc. In certain embodiments, the one or more sensors are part of or located in the second real-world vehicle. For example, the one or more sensors communicate and store sensor data in an ECM or ECU of the second real-world vehicle. In some embodiments, the one or more sensors are part of a computing device that is connected to the second real-world vehicle. For example, the computing device is connected to the second real-world vehicle while the second real-world vehicle is in operation. As an example, the computing device is connected to the second real-world vehicle while the second real-world vehicle is stationary.

In certain embodiments, the second real-world telematics data indicate the operational state of the second real-world vehicle. In some embodiments, the second real-world geolocation data indicate the physical locations of the second real-world vehicle. For example, the second real-world geolocation data include real-time GPS coordinates of the second real-world vehicle as the second real-world vehicle is in operation. As an example, the second real-world geolocation data include a second plurality of stopping points for the second real-world vehicle such as a starting location, an ending location, and one or more intermediate waypoint locations.

At the process 140, one or more second real-world driving characteristics are determined based at least in part upon the second real-world telematics data according to certain embodiments. In various embodiments, the one or more second real-world driving characteristics indicate how the second real-world user drives, such as how frequently the second real-world user drives, type of maneuvers that the second real-world user makes while driving, types of dangerous driving events, types of safe driving events, etc.

In some embodiments, the one or more second real-world driving characteristics refer to one or more driving skills of the second real-world user. For example, the one or more second real-world driving characteristics include a second braking characteristic, a second steering characteristic, and/or a second speeding characteristic. As an example, the second braking characteristic corresponds to the second real-world user's ability to decelerate the second real-world vehicle upon encountering braking obstacles. For example, the second steering characteristic corresponds to the second real-world user's ability to steer the second real-world vehicle upon encountering steering obstacles. As an example, the second speeding characteristic corresponds to the second real-world user's ability to decelerate the second real-world vehicle upon encountering speeding obstacles.

At the process 145, one or more second real-world geolocation characteristics are determined based at least in part upon the second real-world geolocation data according to certain embodiments. In various embodiments, the one or more second real-world geolocation characteristics indicate the type of area associated with the physical locations of the second real-world vehicle such as a city, a suburb, a village, etc.

At the process 150, the second virtual map is generated based at least in part upon the one or more second real-world driving characteristics and the one or more second real-world geolocation characteristics according to some embodiments. In certain embodiments, the second virtual map is generated for a second virtual character associated with the second real-world user. In some embodiments, the second virtual map is a digital representation of the physical locations of the second real-world vehicle. In certain embodiments, the second virtual map includes landmarks that the second real-world user has visited while operating the second real-world vehicle. For example, the second virtual map may show virtual tunnels corresponding to real-world tunnels, virtual stadiums corresponding to real-world stadiums, virtual museums corresponding to real-world museums, etc.

In various embodiments, a second network of virtual roads are generated in the second virtual map based at least in part upon the one or more second real-world driving characteristics and the one or more second real-world geolocation characteristics. In certain embodiments, the one or more second real-world driving characteristics may include the second braking characteristic, the second steering characteristic, and/or the second speeding characteristic. For example, the second braking characteristic may indicate that the second real-world user brakes infrequently while driving. As an example, the second network of virtual roads would include very few virtual road intersections that correspond to the frequency of second real-world user's braking. For example, the second steering characteristic may indicate that the second real-world user makes smooth turns while driving. As an example, the second network of virtual roads would include virtual roads with little or no curves/bends that correspond to the smooth turns made by the second real-world user. For example, the second speeding characteristic may indicate the speed at which the second real-world user normally drives. As an example, the second network of virtual roads would include virtual speed limit signs that correspond to the speed that the second real-world user normally drives at.

In some embodiments, the one or more second real-world geolocation characteristics may indicate that the second real-world user is operating the second real-world vehicle in a rural setting. For example, the second network of virtual roads would include various virtual country roads that correspond to the rural setting.

In various embodiments, the first network of virtual roads in the first virtual map and the second network of virtual roads in the second virtual map are different due to differences between the one or more first real-world driving characteristics and the one or more second real-world driving characteristics, and/or differences between the one or more first real-world geolocation characteristics and the one or more second real-world geolocation characteristics.

At the process 155, the second virtual map is presented in the virtual game according to certain embodiments. For example, the second virtual map is presented in a remote display (e.g., in a mobile device of the second real-world user). In various embodiments, the second virtual character operates a second virtual vehicle in the virtual game. In certain embodiments, the second virtual character exists in the virtual game as a playable character for the second real-world user to control. For example, the second real-world user can direct the second virtual character to operate the second virtual vehicle in traversing the second network of virtual roads in the second virtual map.

According to various embodiments, the first virtual map and the second virtual map are generated to be different in response to differences or similarities in the one or more first real-world driving characteristics and the one or more second real-world driving characteristics, and/or differences or similarities in the one or more first real-world geolocation characteristics and the one or more second real-world geolocation characteristics.

In some embodiments, the one or more first real-world driving characteristics and the one or more second real-world driving characteristics are different, and the one or more first real-world geolocation characteristics and the one or more second real-world geolocation characteristics are the same. In certain embodiments, the first virtual map and the second virtual map are generated to be different in response to the one or more first real-world driving characteristics and the one or more second real-world driving characteristics being different and the one or more first real-world geolocation characteristics and the one or more second real-world geolocation characteristics being the same. For example, both the first network of virtual roads in the first virtual map and the second network of virtual roads in the second virtual map may show virtual city streets, but the first network of virtual roads may include more curves/bends than the second network of virtual roads.

In some embodiments, the one or more first real-world driving characteristics and the one or more second real-world driving characteristics are the same, and the one or more first real-world geolocation characteristics and the one or more second real-world geolocation characteristics are different. In certain embodiments, the first virtual map and the second virtual map are generated to be different in response to the one or more first real-world driving characteristics and the one or more second real-world driving characteristics being the same and the one or more first real-world geolocation characteristics and the one or more second real-world geolocation characteristics being different. For example, the first network of virtual roads in the first virtual map may show virtual city streets and the second network of virtual roads in the second virtual map may show virtual country roads, but the first network of virtual roads may include the same number of intersections as the second network of virtual roads.

In some embodiments, the one or more first real-world driving characteristics and the one or more second real-world driving characteristics are different, and the one or more first real-world geolocation characteristics and the one or more second real-world geolocation characteristics are different. In certain embodiments, the first virtual map and the second virtual map are generated to be different in response to the one or more first real-world driving characteristics and the one or more second real-world driving characteristics being different and the one or more first real-world geolocation characteristics and the one or more second real-world geolocation characteristics being different. For example, the first network of virtual roads in the first virtual map may show virtual city streets with numerous curves/bends, while the second network of virtual roads in the second virtual map may show virtual country roads with little or no curves/bends.

In certain embodiments, the first virtual map is presented in the same virtual game as the second virtual map. In some embodiments, the first virtual map is presented in a different virtual game as the second virtual map. For example, the first virtual map is presented in a first virtual game played the first real-world user, while the second virtual map is presented in a second virtual game played by the second real-world user.

In certain embodiments, instead of the virtual driving environment, the virtual game simulates a virtual role-playing environment in which each of the first and second virtual characters accomplishes a quest. For example, virtual maps are presented in the virtual role-playing environment that depict virtual paths (e.g., virtual trails, virtual rivers, virtual mountain passes, etc.) based at least in part upon the one or more first real-world driving characteristics, the one or more first real-world geolocation characteristics, the one or more second real-world driving characteristics, and the one or more second real-world geolocation characteristics.

In some embodiments, instead of the virtual driving environment, the virtual game simulates a virtual battle environment in which each of the first and second virtual characters fights in a battle. For example, virtual maps are presented in the virtual battle environment that depict virtual battlefields based at least in part upon the one or more first real-world driving characteristics, the one or more first real-world geolocation characteristics, the one or more second real-world driving characteristics, and the one or more second real-world geolocation characteristics.

Figure 2A:
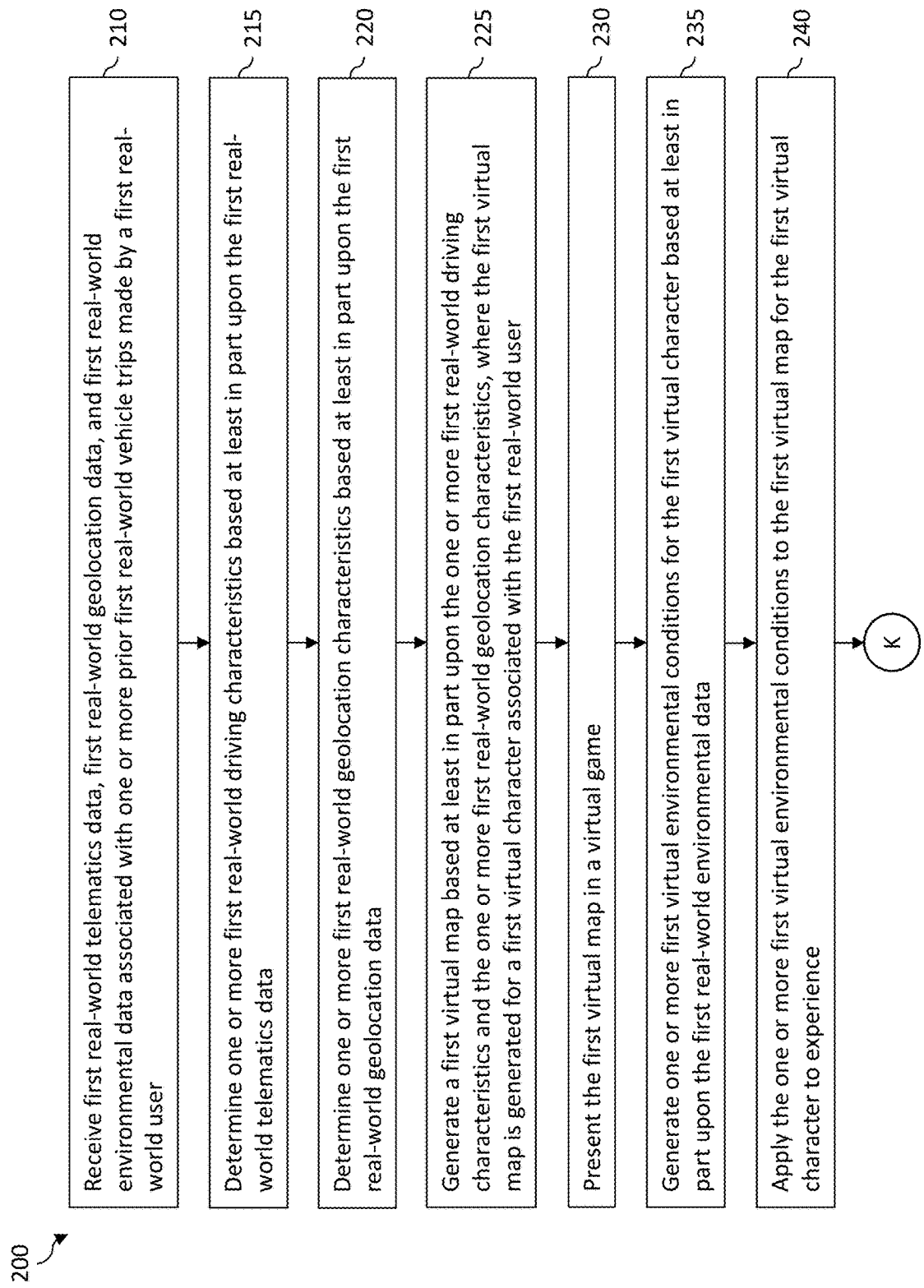
FIG. 2A and FIG. 2B show a simplified method for generating virtual maps in virtual games according to some embodiments of the present disclosure.
Figure 2B:
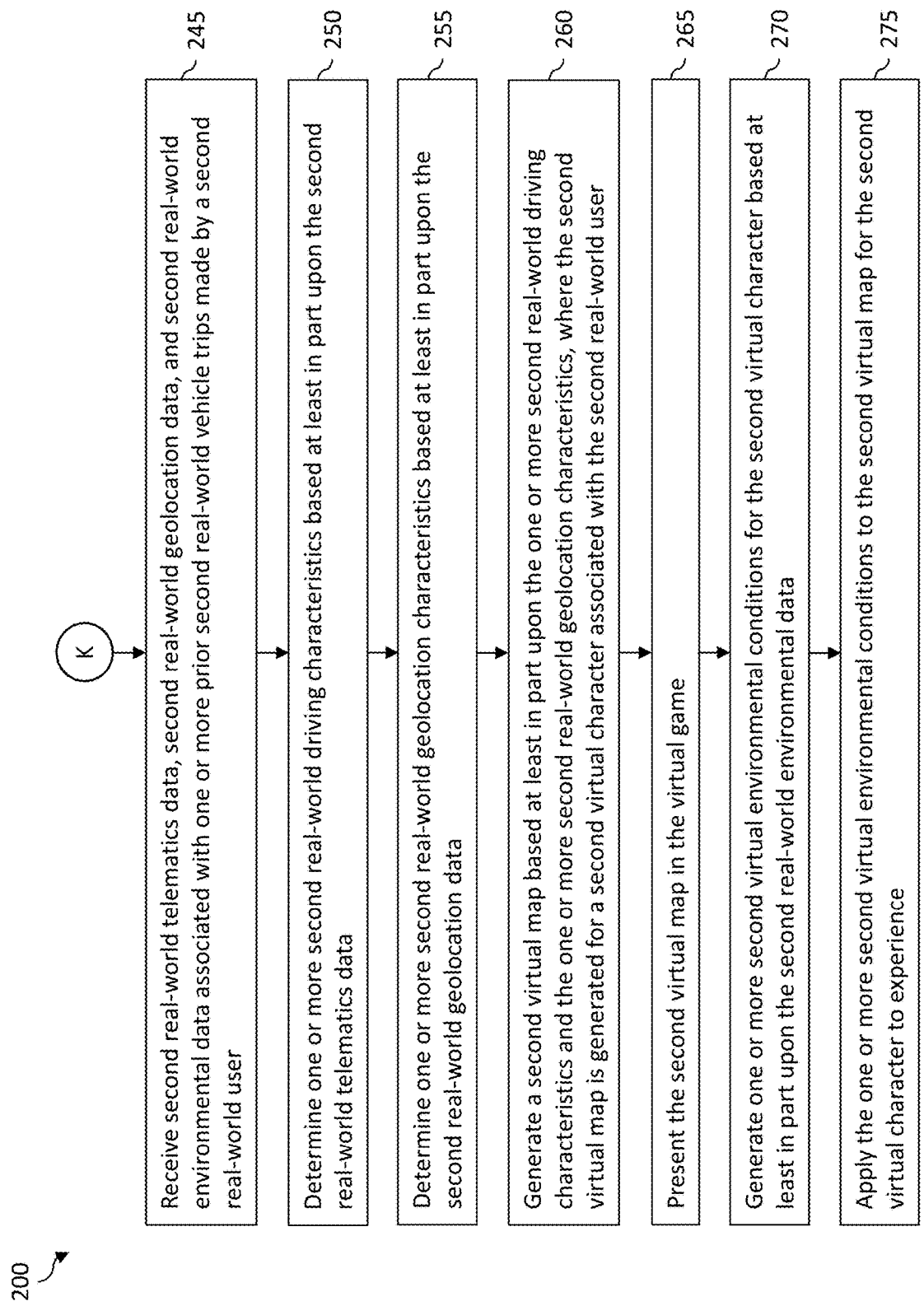

FIG. 2A and FIG. 2B show a simplified method for generating virtual maps in virtual games according to some embodiments of the present disclosure. The figures are merely examples, which should not unduly limit the scope of the claims. One of ordinary skill in the art would recognize many variations, alternatives, and modifications. The method 200 includes process 210 for receiving first real-world data from a first real-world user, process 215 for determining first real-world driving characteristics, process 220 for determining first real-world geolocation characteristics, process 225 for generating a first virtual map, process 230 for presenting the first virtual map, process 235 for generating first virtual environmental conditions, process 240 for applying the first virtual environmental conditions to the first virtual map, process 245 for receiving second real-world data from a second real-world user, process 250 for determining second real-world driving characteristics, process 255 for determining second real-world geolocation characteristics, process 260 for generating a second virtual map, process 265 for presenting the second virtual map, process 270 for generating second virtual environmental conditions, and process 275 for applying the second virtual environmental conditions to the second virtual map. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 210, first real-world telematics data, first real-world geolocation data, and first real-world environmental data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. For example, the one or more prior first real-world vehicle trips include actual vehicle trips made by the first real-world user for any personal and/or business reasons.

In some embodiments, the first real-world telematics data, the first real-world geolocation data, and/or the first real-world environmental data are collected from one or more sensors associated with the first real-world vehicle operated by the first real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, ambient light sensors, rain sensors, etc. As an example, the first real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, ambient light sensors, rain sensors, etc. In certain embodiments, the one or more sensors are part of or located in the first real-world vehicle. For example, the one or more sensors communicate and store sensor data in an ECM or ECU of the first real-world vehicle. In some embodiments, the one or more sensors are part of a computing device that is connected to the first real-world vehicle. For example, the computing device is connected to the first real-world vehicle while the first real-world vehicle is in operation. As an example, the computing device is connected to the first real-world vehicle while the first real-world vehicle is stationary.

In certain embodiments, the first real-world telematics data indicate the operational state of the first real-world vehicle, such as speed, acceleration, braking event, etc. In some embodiments, the first real-world geolocation data indicate the physical locations of the first real-world vehicle. For example, the first real-world geolocation data include real-time GPS coordinates of the first real-world vehicle as the first real-world vehicle is in operation. In certain embodiments, the first real-world environmental data indicate the external environmental conditions of the first real-world vehicle, such as weather conditions (e.g., fog, snowstorm, flood, etc.), traffic conditions (e.g., traffic congestions, detours, vehicle accidents, etc.), and/or road conditions (e.g., road grade, road closures, road constructions, etc.).

At the process 215, one or more first real-world driving characteristics are determined based at least in part upon the first real-world telematics data according to certain embodiments. In various embodiments, the one or more first real-world driving characteristics indicate how the first real-world user drives, such as how frequently the first real-world user drives, type of maneuvers that the first real-world user makes while driving, types of dangerous driving events, types of safe driving events, etc. In some embodiments, the one or more first real-world driving characteristics refer to one or more driving skills of the first real-world user. For example, the one or more first real-world driving characteristics include a first braking characteristic, a first steering characteristic, and/or a first speeding characteristic.

At the process 220, one or more first real-world geolocation characteristics are determined based at least in part upon the first real-world geolocation data according to certain embodiments. In various embodiments, the one or more first real-world geolocation characteristics indicate the type of area associated with the physical locations of the first real-world vehicle (e.g., cityscape, countryside, etc.).

At the process 225, the first virtual map is generated based at least in part upon the one or more first real-world driving characteristics and the one or more first real-world geolocation characteristics according to some embodiments. In certain embodiments, the first virtual map is generated for a first virtual character associated with the first real-world user.

In various embodiments, a first network of virtual roads are generated in the first virtual map based at least in part upon the one or more first real-world driving characteristics and the one or more first real-world geolocation characteristics. In certain embodiments, the one or more first real-world driving characteristics may include the first braking characteristic, the first steering characteristic, and/or the first speeding characteristic. For example, the first braking characteristic may indicate that the first real-world user brakes frequently while driving. As an example, the first network of virtual roads would include numerous virtual road intersections that correspond to the frequency of first real-world user's braking. In some embodiments, the one or more first real-world geolocation characteristics may indicate that the first real-world user is operating the first real-world vehicle in an urban area and the first network of virtual roads would include various virtual city streets.

At the process 230, the first virtual map is presented in a virtual game according to certain embodiments. For example, the first virtual map is presented in a remote display (e.g., in a mobile device of the first real-world user). In various embodiments, the virtual game simulates a virtual driving environment in which the first virtual character operates a first virtual vehicle. In certain embodiments, the first virtual character exists in the virtual game as a playable character for the first real-world user to control. For example, the first real-world user can direct the first virtual character to operate the first virtual vehicle in traversing the first network of virtual roads in the first virtual map.

At the process 235, one or more first virtual environmental conditions are generated based at least in part upon the first real-world environmental data according to some embodiments. In certain embodiments, the one or more first virtual environmental conditions include a first virtual weather condition, a first virtual traffic condition, and/or a first virtual road condition.

In some embodiments, the one or more first real-world environmental data may indicate a weather condition such as a snowstorm. For example, the first virtual weather condition simulates a virtual snowstorm in the first virtual map. In certain embodiments, the one or more first real-world environmental data may indicate a traffic condition such as a traffic jam. As an example, the first virtual traffic condition simulates a virtual traffic jam in the first virtual map. In some embodiments, the one or more first real-world environmental data may indicate a road condition such as a road construction. For example, the first virtual road condition simulates a virtual road construction in the first virtual map.

At the process 240, the one or more first virtual environmental conditions are applied to the first virtual map for the first virtual character to experience according to some embodiments. In certain embodiments, the first virtual weather condition simulates the virtual snowstorm. For example, the first virtual character may experience the effects of the virtual snowstorm such as reduced visibility when operating the first virtual vehicle during the virtual snowstorm. In some embodiments, the first virtual traffic condition simulates the virtual traffic jam. As an example, the first virtual character may experience the effects of the virtual traffic jam such as increased vehicular queuing when operating the first virtual vehicle at the time of the virtual traffic jam. In certain embodiments, the first virtual road condition simulates the virtual road construction. For example, the first virtual character may experience the effects of the virtual road construction such as reduced speed when operating the first virtual vehicle around the virtual road construction.

At the process 245, second real-world telematics data, second real-world geolocation data, and second real-world environmental data associated with one or more prior second real-world vehicle trips made by the second real-world user are received according to some embodiments. In various embodiments, the second real-world user is a real-world driver of a second real-world vehicle. In certain embodiments, the one or more prior second real-world vehicle trips correspond to actual vehicle trips that the second real-world user has made in the past. For example, the one or more prior second real-world vehicle trips include actual vehicle trips made by the second real-world user for any personal and/or business reasons.

In some embodiments, the second real-world telematics data, the second real-world geolocation data, and/or the second real-world environmental data are collected from one or more sensors associated with the second real-world vehicle operated by the second real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, ambient light sensors, rain sensors, etc. As an example, the second real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, ambient light sensors, rain sensors, etc. In certain embodiments, the one or more sensors are part of or located in the second real-world vehicle. For example, the one or more sensors communicate and store sensor data in an ECM or ECU of the second real-world vehicle. In some embodiments, the one or more sensors are part of a computing device that is connected to the second real-world vehicle. For example, the computing device is connected to the second real-world vehicle while the second real-world vehicle is in operation. As an example, the computing device is connected to the second real-world vehicle while the second real-world vehicle is stationary.

In certain embodiments, the second real-world telematics data indicate the operational state of the second real-world vehicle. In some embodiments, the second real-world geolocation data indicate the physical locations of the second real-world vehicle. For example, the second real-world geolocation data include real-time GPS coordinates of the second real-world vehicle as the second real-world vehicle is in operation. In certain embodiments, the second real-world environmental data indicate the external environmental conditions of the second real-world vehicle, such as weather conditions, traffic conditions, and/or road conditions. In various embodiments, the second real-world environmental data (as well as the first real-world environment data) can be obtained from various databases that provide real-time information on weather, traffic, and/or road conditions.

At the process 250, one or more second real-world driving characteristics are determined based at least in part upon the second real-world telematics data according to certain embodiments. In various embodiments, the one or more second real-world driving characteristics indicate how the second real-world user drives, such as how frequently the second real-world user drives, type of maneuvers that the second real-world user makes while driving, types of dangerous driving events, types of safe driving events, etc. In some embodiments, the one or more second real-world driving characteristics refer to one or more driving skills of the second real-world user. For example, the one or more second real-world driving characteristics include a second braking characteristic, a second steering characteristic, and/or a second speeding characteristic.

At the process 255, one or more second real-world geolocation characteristics are determined based at least in part upon the second real-world geolocation data according to certain embodiments. In various embodiments, the one or more second real-world geolocation characteristics indicate the type of area associated with the physical locations of the second real-world vehicle (e.g., urban, rural, etc.).

At the process 260, the second virtual map is generated based at least in part upon the one or more second real-world driving characteristics and the one or more second real-world geolocation characteristics according to some embodiments. In certain embodiments, the second virtual map is generated for a second virtual character associated with the second real-world user.

In various embodiments, a second network of virtual roads are generated in the second virtual map based at least in part upon the one or more second real-world driving characteristics and the one or more second real-world geolocation characteristics. In certain embodiments, the one or more second real-world driving characteristics may include the second braking characteristic, the second steering characteristic, and/or the second speeding characteristic. For example, the second steering characteristic may indicate that the second real-world user makes smooth turns while driving. As an example, the second network of virtual roads would include virtual roads with little or no curves/bends that correspond to the smooth turns made by the second real-world user. In some embodiments, the one or more second real-world geolocation characteristics may indicate that the second real-world user is operating the second real-world vehicle in a rural area and the second network of virtual roads would include various virtual country roads.

At the process 265, the second virtual map is presented in the virtual game according to certain embodiments. For example, the second virtual map is presented in a remote display (e.g., in a mobile device of the second real-world user). In various embodiments, the second virtual character operates a second virtual vehicle in the virtual game. In certain embodiments, the second virtual character exists in the virtual game as a playable character for the second real-world user to control. For example, the second real-world user can direct the second virtual character to operate the second virtual vehicle in traversing the second network of virtual roads in the second virtual map.

At the process 270, one or more second virtual environmental conditions are generated based at least in part upon the second real-world environmental data according to some embodiments. In certain embodiments, the one or more second virtual environmental conditions include a second virtual weather condition, a second virtual traffic condition, and/or a second virtual road condition.

In some embodiments, the one or more second real-world environmental data may indicate a weather condition such as a flood. For example, the second virtual weather condition simulates a virtual flood in the second virtual map. In certain embodiments, the one or more second real-world environmental data may indicate a traffic condition such as a vehicle accident. As an example, the second virtual traffic condition simulates a virtual vehicle accident in the second virtual map. In some embodiments, the one or more second real-world environmental data may indicate a road condition such as a road closure. For example, the second virtual road condition simulates a virtual road closure in the second virtual map.

At the process 275, the one or more second virtual environmental conditions are applied to the second virtual map for the second virtual character to experience according to some embodiments. In certain embodiments, the second virtual weather condition simulates the virtual flood. For example, the second virtual character may experience the effects of the virtual flood such as reduced maneuverability when operating the second virtual vehicle during the virtual flood. In some embodiments, the second virtual traffic condition simulates the virtual vehicle accident. As an example, the second virtual character may experience the effects of the virtual vehicle accident such as reduced speed when operating the second virtual vehicle at the time of the virtual vehicle accident. In certain embodiments, the second virtual road condition simulates the virtual road closure. For example, the second virtual character may experience the effects of the virtual road closure such as increased trip times when operating the second virtual vehicle around the virtual road closure.

In various embodiments, the one or more first virtual environmental conditions and the one or more second environmental conditions are different due to differences between the first real-world environmental data and the second real-world environmental data.

As discussed above and further emphasized here, FIG. 1A, FIG. 1B, FIG. 2A and FIG. 2B are merely examples, which should not unduly limit the scope of the claims. One of ordinary skill in the art would recognize many variations, alternatives, and modifications. In some examples, at the process 110 and/or the process 210, data from video or photographic capturing devices are also received. For example, the video or photographic capturing devices may be utilized to capture images internally or externally to the first real-world vehicle to determine the one or more first real-world driving characteristics and/or conditions surrounding the first real-world vehicle. In certain examples, at the process 135 and/or the process 245, data from video or photographic capturing devices are also received. For example, the video or photographic capturing devices may be utilized to capture images internally or externally to the second real-world vehicle to determine the one or more second real-world driving characteristics and/or conditions surrounding the second real-world vehicle.

Figure 3:
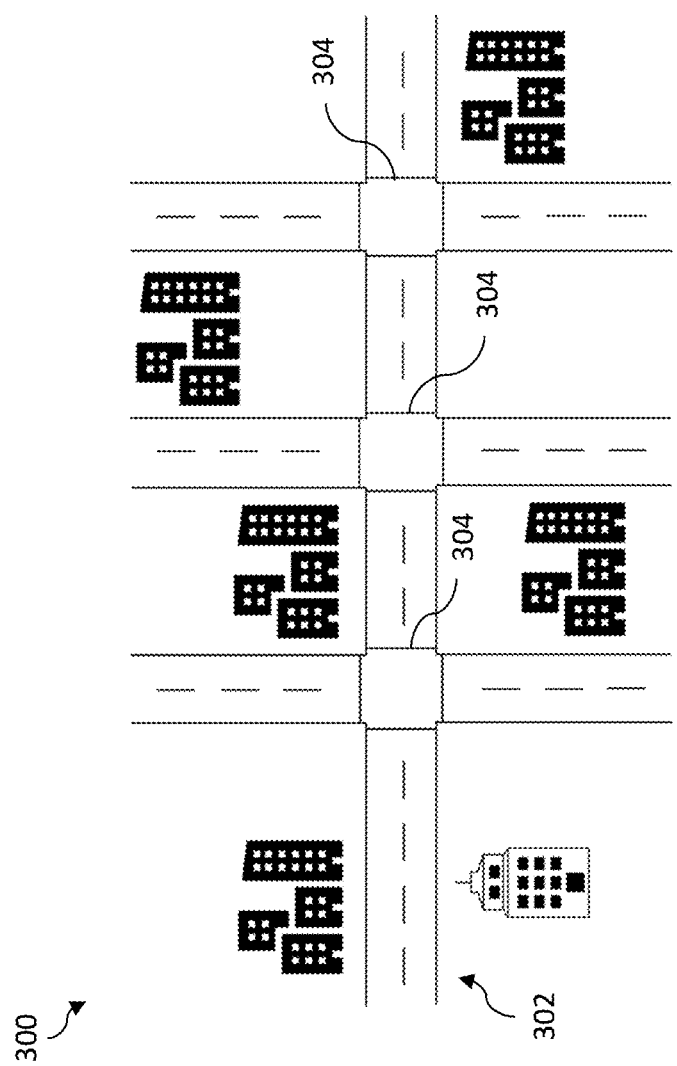
FIG. 3 shows a simplified diagram illustrating a virtual map according to certain embodiments of the present disclosure.
Figure 4:
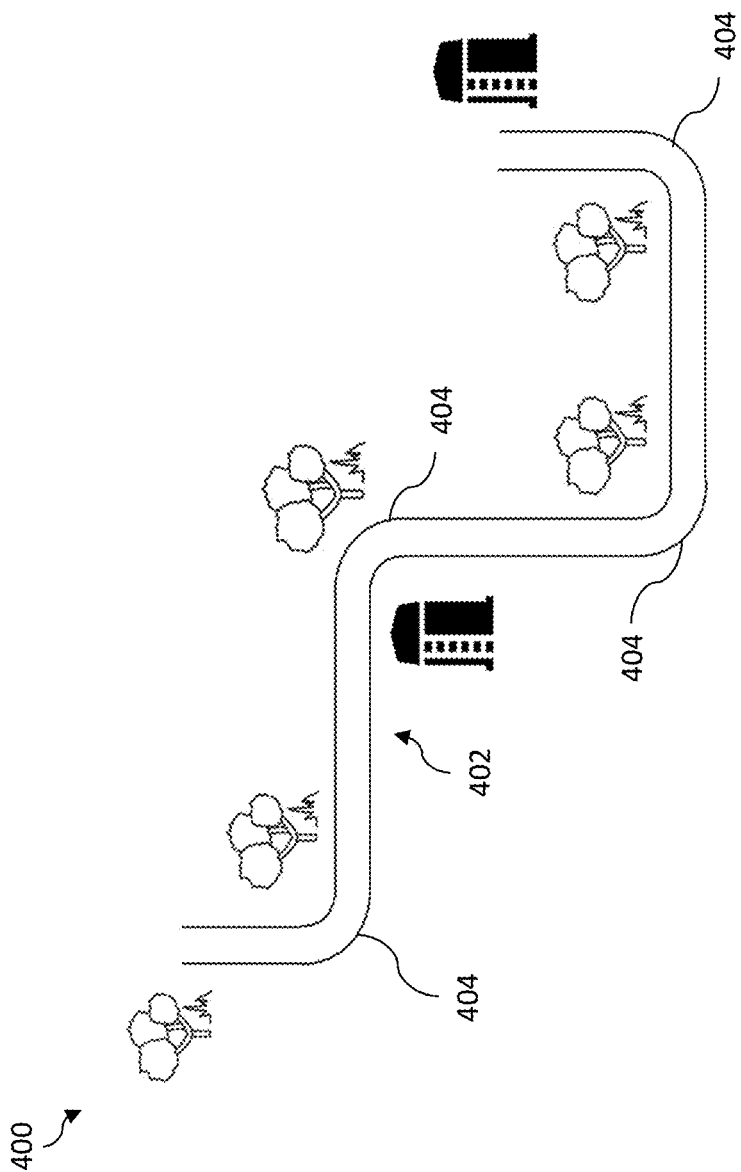
FIG. 4 shows a simplified diagram illustrating a virtual map according to some embodiments of the present disclosure.

FIG. 3 and FIG. 4 show simplified diagrams illustrating one or more virtual maps that are generated by the method 100 as shown in FIG. 1A and FIG. 1B, and/or the method 200 as shown in FIG. 2A and FIG. 2B according to certain embodiments of the present disclosure. The figures are merely examples, which should not unduly limit the scope of the claims. One of ordinary skill in the art would recognize many variations, alternatives, and modifications.

In some embodiments where the virtual driving environment is simulated in the virtual game, the first virtual map and the second virtual map that have been generated by the method 100 and/or the method 200 are represented by various virtual roads. In certain embodiments, FIG. 3 shows a virtual map 300 for the first real-world user. For example, based at least in part upon the one or more first real-world geolocation characteristics of the first real-world user, the virtual map 300 includes a network of virtual roads 302 in an urban setting (e.g., virtual city streets). As an example, based at least in part upon the one or more first real-world driving characteristics of the first real-world user, the network of virtual roads 302 includes one or more road intersections 304 that correspond to a frequency of braking by the first real-world user while operating the first real-world vehicle.

In some embodiments, FIG. 4 shows a virtual map 400 for the second real-world user. For example, based at least in part upon the one or more second real-world geolocation characteristics of the second real-world user, the virtual map 400 includes a network of virtual roads 402 in a rural setting (e.g., virtual country roads). As an example, based at least in part upon the one or more second real-world driving characteristics of the second real-world user, the network of virtual roads 402 includes one or more curves/bends 404 that correspond to sharp turns made by the second real-world user while operating the second real-world vehicle.

Figure 5:
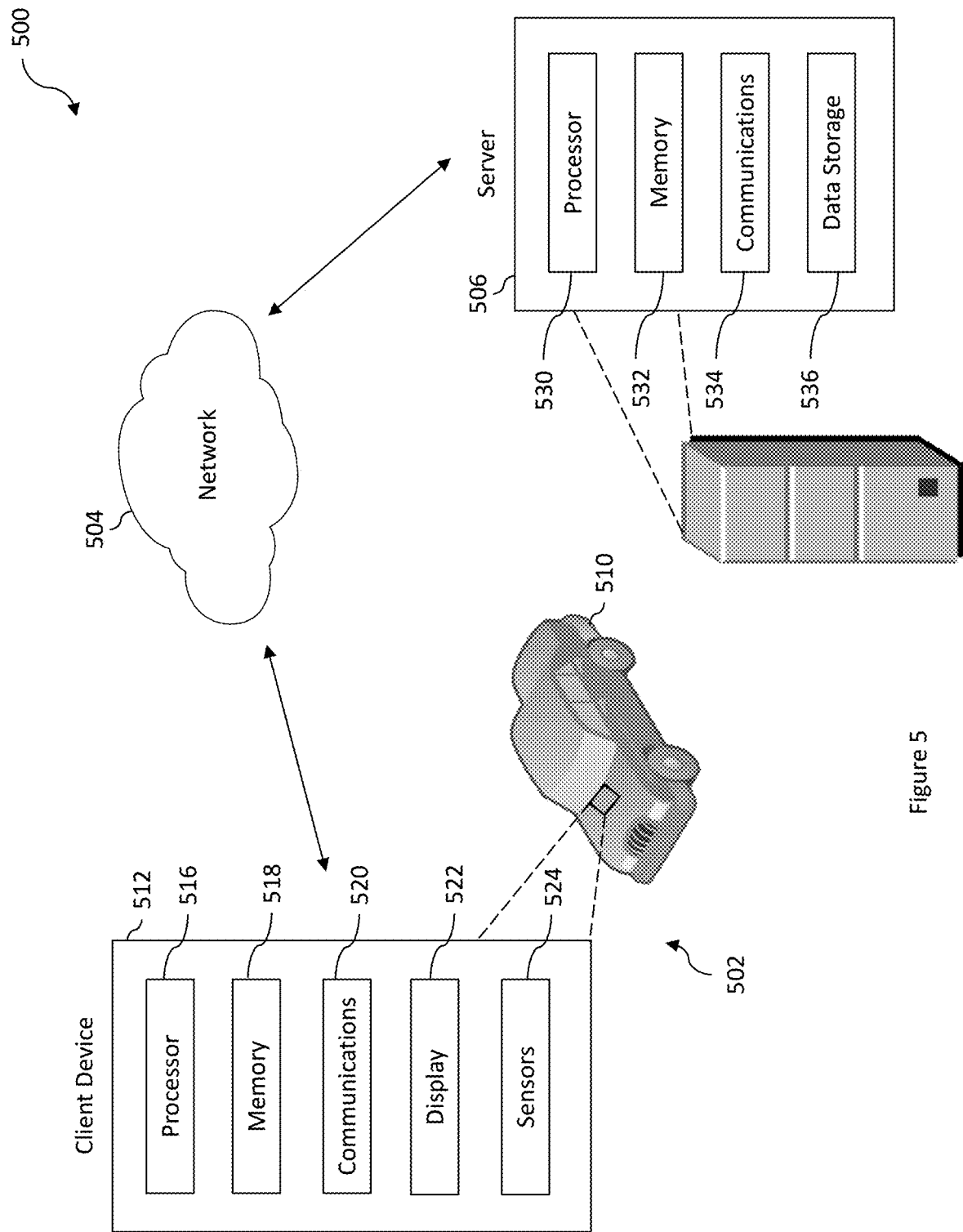
FIG. 5 shows a simplified computing device for generating virtual maps in virtual games according to certain embodiments of the present disclosure.

II. One or More Systems for Generating Virtual Maps in Virtual Games According to Certain Embodiments FIG. 5 shows a simplified system for generating virtual maps in virtual games according to certain embodiments of the present disclosure. This figure is merely an example, which should not unduly limit the scope of the claims. One of ordinary skill in the art would recognize many variations, alternatives, and modifications. The system 500 includes a vehicle system 502, a network 504, and a server 506. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 500 is used to implement the method 100 and/or the method 200. According to certain embodiments, the vehicle system 502 includes a vehicle 510 and a client device 512 associated with the vehicle 510. For example, the client device 512 is an on-board computer embedded or located in the vehicle 510. As an example, the client device 512 is a mobile device (e.g., a smartphone) that is connected (e.g., via wired or wireless links) to the vehicle 510. As an example, the client device 512 includes a processor 516 (e.g., a central processing unit (CPU), a graphics processing unit (GPU)), a memory 518 (e.g., random-access memory (RAM), read-only memory (ROM), flash memory), a communications unit 520 (e.g., a network transceiver), a display unit 522 (e.g., a touchscreen), and one or more sensors 524 (e.g., an accelerometer, a gyroscope, a magnetometer, a barometer, a GPS sensor). In certain embodiments, the client device 512 represents the on-board computer in the vehicle 510 and the mobile device connected to the vehicle 510. For example, the one or more sensors 524 may be in the vehicle 510 and in the mobile device connected to the vehicle 510.

In some embodiments, the vehicle 510 is operated by a real-world user, such as the first real-world user and/or the second real-world user. In certain embodiments, multiple vehicles 510 exist in the system 500 which are operated by respective users. For example, the first real-world user operates the first real-world vehicle and the second real-world user operates the second real-world vehicle.

In various embodiments, during vehicle trips, the one or more sensors 524 monitor the vehicle 510 by collecting data associated with various operating parameters of the vehicle, such as speed, acceleration, braking, location, and other suitable parameters. In certain embodiments, the collected data include telematics data, geolocation data, and/or environmental data. According to some embodiments, the data are collected continuously, at predetermined time intervals, and/or based on a triggering event (e.g., when each sensor has acquired a threshold amount of sensor measurements). In various embodiments, the collected data represent the first real-world telematics data, the first real-world geolocation data, the first real-world environmental data, the second real-world telematics data, the second real-world geolocation data, and/or the second real-world environmental data in the method 100 and/or the method 200.

According to certain embodiments, the collected data are stored in the memory 518 before being transmitted to the server 506 using the communications unit 520 via the network 504 (e.g., via a local area network (LAN), a wide area network (WAN), the Internet). In some embodiments, the collected data are transmitted directly to the server 506 via the network 504. For example, the collected data are transmitted to the server 506 without being stored in the memory 518. In certain embodiments, the collected data are transmitted to the server 506 via a third party. For example, a data monitoring system stores any and all data collected by the one or more sensors 524 and transmits those data to the server 506 via the network 504 or a different network.

According to some embodiments, the server 506 includes a processor 530 (e.g., a microprocessor, a microcontroller), a memory 532, a communications unit 534 (e.g., a network transceiver), and a data storage 536 (e.g., one or more databases). In some embodiments, the server 506 is a single server, while in certain embodiments, the server 406 includes a plurality of servers with distributed processing. In FIG. 5, the data storage 536 is shown to be part of the server 506. In certain embodiments, the data storage 536 is a separate entity coupled to the server 506 via a network such as the network 504. In some embodiments, the server 506 includes various software applications stored in the memory 532 and executable by the processor 530. For example, these software applications include specific programs, routines, or scripts for performing functions associated with the method 100 and/or the method 200. As an example, the software applications include general-purpose software applications for data processing, network communication, database management, web server operation, and/or other functions typically performed by a server.

According to various embodiments, the server 506 receives, via the network 504, the data collected by the one or more sensors 524 using the communications unit 534 and stores the data in the data storage 536. For example, the server 506 then processes the data to perform one or more processes of the method 100 and/or one or more processes of the method 200.

According to certain embodiments, any related information determined or generated by the method 100 and/or the method 200 (e.g., real-world driving characteristics, real-world geolocation characteristics, virtual maps, etc.) are transmitted back to the client device 512, via the network 504, to be provided (e.g., displayed) to the user via the display unit 522.

In some embodiments, one or more processes of the method 100 and/or one or more processes of the method 200 are performed by the client device 512. For example, the processor 516 of the client device 512 processes the data collected by the one or more sensors 524 to perform one or more processes of the method 100 and/or one or more processes of the method 200.

Figure 6:
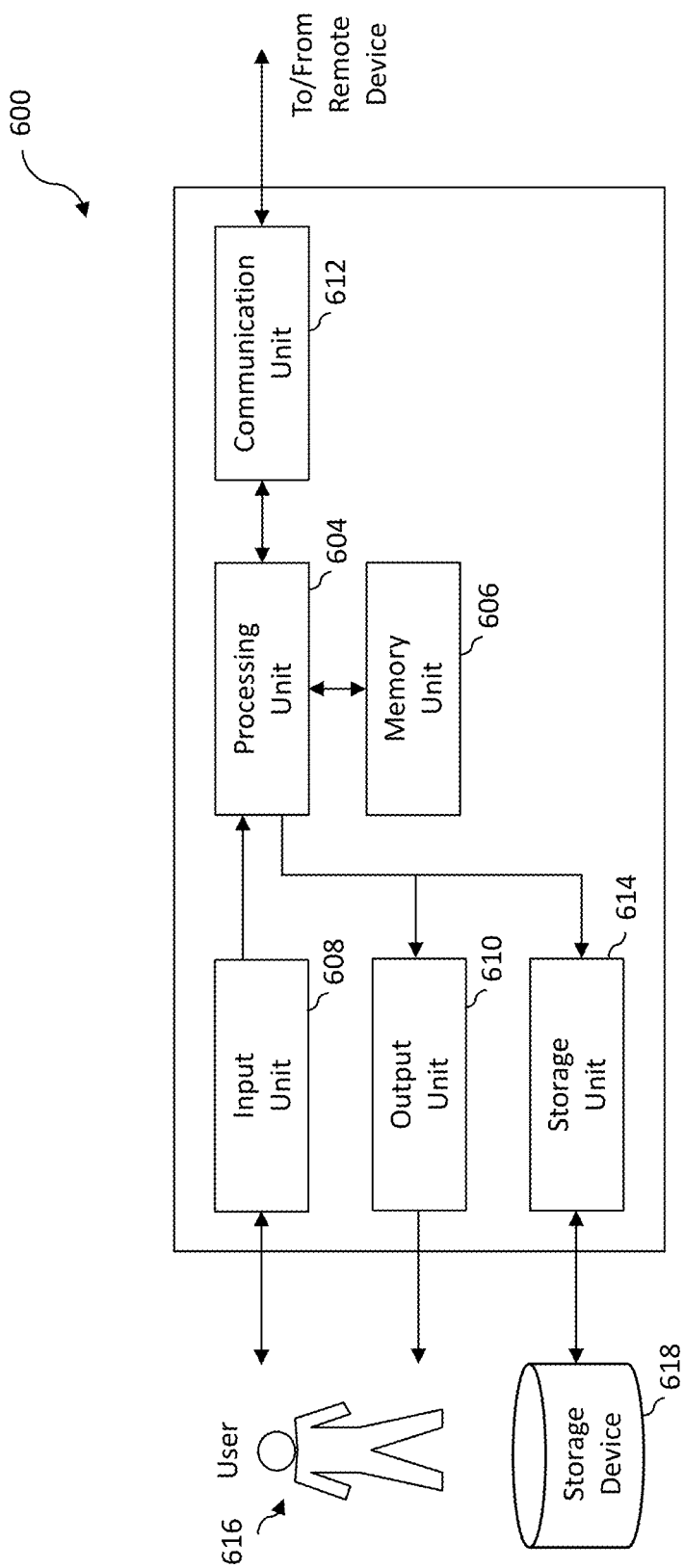
FIG. 6 shows a simplified system for generating virtual maps in virtual games according to certain embodiments of the present disclosure.

III. One or More Computing Devices for Generating Virtual Maps in Virtual Games According to Certain Embodiments FIG. 6 shows a simplified computing device for generating virtual maps in virtual games according to certain embodiments of the present disclosure. This figure is merely an example, which should not unduly limit the scope of the claims. One of ordinary skill in the art would recognize many variations, alternatives, and modifications. The computing device 600 includes a processing unit 604, a memory unit 606, an input unit 608, an output unit 610, a communication unit 612, and a storage unit 614. In various embodiments, the computing device 600 is configured to be in communication with a user 616 and/or a storage device 618. In certain embodiments, the computing device 600 includes the client device 512 and/or the server 506 of FIG. 5. In some embodiments, the computing device 600 is configured to implement the method 100 of FIG. 1A and/or FIG. 1B, and/or the method 200 of FIG. 2A and/or FIG. 2B. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 604 is configured for executing instructions, such as instructions to implement the method 100 of FIG. 1A and/or FIG. 1B, and/or the method 200 of FIG. 2A and/or FIG. 2B. In some embodiments, the executable instructions are stored in the memory unit 606. In certain embodiments, the processing unit 604 includes one or more processing units (e.g., in a multi-core configuration). In some embodiments, the processing unit 604 includes and/or is communicatively coupled to one or more modules for implementing the methods and systems described in the present disclosure. In certain embodiments, the processing unit 604 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 606 includes a device allowing information, such as executable instructions and/or other data to be stored and retrieved. In some embodiments, the memory unit 606 includes one or more computer readable media. In certain embodiments, the memory unit 606 includes computer readable instructions for providing a user interface, such as to the user 616, via the output unit 610. In some embodiments, a user interface includes a web browser and/or a client application. For example, a web browser enables the user 616 to interact with media and/or other information embedded on a web page and/or a website. In certain embodiments, the memory unit 606 includes computer readable instructions for receiving and processing an input via the input unit 608. In some embodiments, the memory unit 606 includes RAM such as dynamic RAM (DRAM) or static RAM (SRAM), ROM, erasable programmable read-only memory (EPROM), electrically erasable programmable read-only memory (EEPROM), and/or non-volatile RAM (NVRAM).

In various embodiments, the input unit 608 is configured to receive input (e.g., from the user 616). In some embodiments, the input unit 608 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 608 is configured to function as both an input unit and an output unit.

In various embodiments, the output unit 610 includes a media output unit configured to present information to the user 616. In some embodiments, the output unit 610 includes any component capable of conveying information to the user 616. In certain embodiments, the output unit 610 includes an output adapter such as a video adapter and/or an audio adapter. For example, the output unit 610 is operatively coupled to the processing unit 604 and/or a visual display device to present information to the user 616 (e.g., a liquid crystal display (LCD), a light emitting diode (LED) display, an organic light emitting diode (OLED) display, a cathode ray tube (CRT) display, a projected display, etc.). As an example, the output unit 610 is operatively coupled to the processing unit 604 and/or an audio display device to present information to the user 616 (e.g., a speaker arrangement or headphones).

In various embodiments, the communication unit 612 is configured to be communicatively coupled to a remote device. In some embodiments, the communication unit 612 includes a wired network adapter, a wireless network adapter, a wireless data transceiver for use with a mobile phone network (e.g., 3G, 4G, 5G, Bluetooth, near-field communication (NFC), etc.), and/or other mobile data networks. In certain embodiments, other types of short-range or long-range networks may be used. In some embodiments, the communication unit 612 is configured to provide email integration for communicating data between a server and one or more clients.

In various embodiments, the storage unit 614 is configured to enable communication between the computing device 600 and the storage device 618. In some embodiments, the storage unit 614 is a storage interface. For example, the storage interface is any component capable of providing the processing unit 604 with access to the storage device 618. In certain embodiments, the storage unit 614 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 604 with access to the storage device 618.

In various embodiments, the storage device 618 includes any computer-operated hardware suitable for storing and/or retrieving data. In certain embodiments, the storage device 618 is integrated in the computing device 600. In some embodiments, the storage device 618 includes a database such as a local database or a cloud database. In certain embodiments, the storage device 618 includes one or more hard disk drives. In some embodiments, the storage device 618 is external and is configured to be accessed by a plurality of server systems. In certain embodiments, the storage device 618 includes multiple storage units such as hard disks or solid state disks in a redundant array of inexpensive disks configuration. In some embodiments, the storage device 618 includes a storage area network and/or a network attached storage system.

IV. Examples of Certain Embodiments of the Present Disclosure

According to certain embodiments, a method for generating one or more virtual maps in one or more virtual games includes receiving first real-world telematics data and first real-world geolocation data associated with one or more prior first real-world vehicle trips made by a first real-world user. Also, the method includes determining one or more first real-world driving characteristics based at least in part upon the first real-world telematics data and determining one or more first real-world geolocation characteristics based at least in part upon the first real-world geolocation data. Additionally, the method includes generating a first virtual map based at least in part upon the one or more first real-world driving characteristics and the one or more first real-world geolocation characteristics, where the first virtual map is generated for a first virtual character associated with the first real-world user. The method then includes presenting the first virtual map in a virtual game. Further, the method includes receiving second real-world telematics data and second real-world geolocation data associated with one or more prior second real-world vehicle trips made by a second real-world user. Also, the method includes determining one or more second real-world driving characteristics based at least in part upon the second real-world telematics data and determining one or more second real-world geolocation characteristics based at least in part upon the second real-world geolocation data. Additionally, the method includes generating a second virtual map based at least in part upon the one or more second real-world driving characteristics and the one or more second real-world geolocation characteristics, where the second virtual map is generated for a second virtual character associated with the second real-world user. The method then includes presenting the second virtual map in the virtual game. The first virtual map and the second virtual map are generated to be different in response to the one or more first real-world driving characteristics, the one or more second real-world driving characteristics, the one or more first real-world geolocation characteristics, and the one or more second real-world geolocation characteristics. For example, the method is implemented according to at least FIG. 1A, FIG. 1B, FIG. 2A, and/or FIG. 2B.

According to some embodiments, a computing device for generating one or more virtual maps in one or more virtual games includes one or more processors and a memory that stores instructions for execution by the one or more processors. The instructions, when executed, cause the one or more processors to receive first real-world telematics data and first real-world geolocation data associated with one or more prior first real-world vehicle trips made by a first real-world user. Also, the instructions, when executed, cause the one or more processors to determine one or more first real-world driving characteristics based at least in part upon the first real-world telematics data and determine one or more first real-world geolocation characteristics based at least in part upon the first real-world geolocation data. Additionally, the instructions, when executed, cause the one or more processors to generate a first virtual map based at least in part upon the one or more first real-world driving characteristics and the one or more first real-world geolocation characteristics, where the first virtual map is generated for a first virtual character associated with the first real-world user. The instructions, when executed, then cause the one or more processors to present the first virtual map in a virtual game. Further, the instructions, when executed, cause the one or more processors to receive second real-world telematics data and second real-world geolocation data associated with one or more prior second real-world vehicle trips made by a second real-world user. Also, the instructions, when executed, cause the one or more processors to determine one or more second real-world driving characteristics based at least in part upon the second real-world telematics data and determine one or more second real-world geolocation characteristics based at least in part upon the second real-world geolocation data. Additionally, the instructions, when executed, cause the one or more processors to generate a second virtual map based at least in part upon the one or more second real-world driving characteristics and the one or more second real-world geolocation characteristics, where the second virtual map is generated for a second virtual character associated with the second real-world user. The instructions, when executed, then cause the one or more processors to present the second virtual map in the virtual game. The first virtual map and the second virtual map are generated to be different in response to the one or more first real-world driving characteristics, the one or more second real-world driving characteristics, the one or more first real-world geolocation characteristics, and the one or more second real-world geolocation characteristics. For example, the computing device is implemented according to at least FIG. 5 and/or FIG. 6.

According to certain embodiments, a non-transitory computer-readable medium stores instructions for generating one or more virtual map in one or more virtual games. The instructions are executed by one or more processors of a computing device. The non-transitory computer-readable medium includes instructions to receive first real-world telematics data and first real-world geolocation data associated with one or more prior first real-world vehicle trips made by a first real-world user. Also, the non-transitory computer-readable medium includes instructions to determine one or more first real-world driving characteristics based at least in part upon the first real-world telematics data and determine one or more first real-world geolocation characteristics based at least in part upon the first real-world geolocation data. Additionally, the non-transitory computer-readable medium includes instructions to generate a first virtual map based at least in part upon the one or more first real-world driving characteristics and the one or more first real-world geolocation characteristics, where the first virtual map is generated for a first virtual character associated with the first real-world user. The non-transitory computer-readable medium then includes instructions to present the first virtual map in a virtual game. Further, the non-transitory computer-readable medium includes instructions to receive second real-world telematics data and second real-world geolocation data associated with one or more prior second real-world vehicle trips made by a second real-world user. Also, the non-transitory computer-readable medium includes instructions to determine one or more second real-world driving characteristics based at least in part upon the second real-world telematics data and determine one or more second real-world geolocation characteristics based at least in part upon the second real-world geolocation data. For example, the non-transitory computer-readable medium is implemented according to at least FIG. 1A, FIG. 1B, FIG. 2A, FIG. 2B, FIG. 5, and/or FIG. 6.

V. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VI. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for generating one or more virtual maps in one or more virtual games, the computer-implemented method comprising:
    receiving, by a computing device, (i) first real-world telematics data from one or more sensors of a first electronic device connected to a first vehicle and (ii) first real-world geolocation data associated with one or more prior first real-world vehicle trips made by a first real-world user;
    determining, by the computing device and using a trained deep-learning model, one or more first real-world driving characteristics based at least in part upon first recognizable patterns of the first real-world telematics data;
    determining, by the computing device, one or more first real-world geolocation characteristics based at least in part upon the first real-world geolocation data;
    generating, by the computing device, a first virtual map based at least in part upon the one or more first real-world driving characteristics and the one or more first real-world geolocation characteristics, the first virtual map being generated for a first virtual character associated with the first real-world user;
    presenting, by the computing device through a user interface of the first electronic device, at least the first virtual map in a virtual game;

receiving, by the computing device, (i) second real-world telematics data from one or more sensors of a second electronic device connected to a second vehicle, and (ii) second real-world geolocation data associated with one or more prior second real-world vehicle trips made by a second real-world user;

determining, by the computing device and using the trained deep-learning model, one or more second real-world driving characteristics based at least in part upon second recognizable patterns of the second real-world telematics data;

determining, by the computing device, one or more second real-world geolocation characteristics based at least in part upon the second real-world geolocation data;

generating, by the computing device, a second virtual map based at least in part upon the one or more second real-world driving characteristics and the one or more second real-world geolocation characteristics, the second virtual map being generated for a second virtual character associated with the second real-world user; and presenting, by the computing device through a user interface of the second electronic device, at least the second virtual map in the virtual game;

wherein:
the first virtual map and the second virtual map are generated to be different in response to the one or more first real-world driving characteristics, the one or more second real-world driving characteristics, the one or more first real-world geolocation characteristics, and the one or more second real-world geolocation characteristics; and the first virtual map and the second virtual map are presented at a same time in a same virtual game played by the first real user or the second real user.

2. The computer-implemented method of claim 1, wherein:
the one or more first real-world driving characteristics and the one or more second real-world driving characteristics are different;
the one or more first real-world geolocation characteristics and the one or more second real-world geolocation characteristics are the same; and
the first virtual map and the second virtual map are generated to be different in response to the one or more first real-world driving characteristics and the one or more second real-world driving characteristics being different and the one or more first real-world geolocation characteristics and the one or more second real-world geolocation characteristics being the same.

3. The computer-implemented method of claim 1, wherein:
the one or more first real-world driving characteristics and the one or more second real-world driving characteristics are the same;
the one or more first real-world geolocation characteristics and the one or more second real-world geolocation characteristics are different; and
the first virtual map and the second virtual map are generated to be different in response to the one or more first real-world driving characteristics and the one or more second real-world driving characteristics being the same and the one or more first real-world geolocation characteristics and the one or more second real-world geolocation characteristics being different.

4. The computer-implemented method of claim 1, wherein:
the one or more first real-world driving characteristics and the one or more second real-world driving characteristics are different;
the one or more first real-world geolocation characteristics and the one or more second real-world geolocation characteristics are different; and
the first virtual map and the second virtual map are generated to be different in response to the one or more first real-world driving characteristics and the one or more second real-world driving characteristics being different and the one or more first real-world geolocation characteristics and the one or more second real-world geolocation characteristics being different.

5. The computer-implemented method of claim 1, further comprising:
receiving, by the computing device, first real-world environmental data associated with the one or more prior first real-world vehicle trips made by the first real-world user;

generating, by the computing device, one or more first virtual environmental conditions for the first virtual character based at least in part upon the first real-world environmental data; and applying, by the computing device, the one or more first virtual environmental conditions to the first virtual map for the first virtual character to experience in the virtual game.

6. The computer-implemented method of claim 5, further comprising:
receiving, by the computing device, second real-world environmental data associated with the one or more prior second real-world vehicle trips made by the second real-world user;

generating, by the computing device, one or more second virtual environmental conditions for the second virtual character based at least in part upon the second real-world environmental data; and applying, by the computing device, the one or more second virtual environmental conditions to the second virtual map for the second virtual character to experience in the virtual game.

7. The computer-implemented method of claim 1, wherein the generating, by the computing device, the first virtual map based at least in part upon the one or more first real-world driving characteristics and the one or more first real-world geolocation characteristics includes:
generating a first network of virtual roads in the first virtual map based at least in part upon the one or more first real-world driving characteristics and the one or more first real-world geolocation characteristics.

8. The computer-implemented method of claim 7, wherein the generating, by the computing device, the second virtual map based at least in part upon the one or more second real-world driving characteristics and the one or more second real-world geolocation characteristics includes:
generating a second network of virtual roads in the second virtual map based at least in part upon the one or more second real-world driving characteristics and the one or more second real-world geolocation characteristics.

9. The computer-implemented method of claim 8, wherein the first network of virtual roads in the first virtual map and the second network of virtual roads in the second virtual map are different.

10. A computing device for generating one or more virtual maps in one or more virtual games, the computing device comprising:
one or more processors; and
a memory storing instructions that, when executed by the one or more processors, cause the one or more processors to:
receive (i) first real-world telematics data from one or more sensors of a first electronic device connected to a first vehicle and (ii) first real-world geolocation data associated with one or more prior first real-world vehicle trips made by a first real-world user;
determine, using a trained deep-learning model, one or more first real-world driving characteristics based at least in part upon first recognizable patterns of the first real-world telematics data;
determine one or more first real-world geolocation characteristics based at least in part upon the first real-world geolocation data;
generate a first virtual map based at least in part upon the one or more first real-world driving characteristics and the one or more first real-world geolocation characteristics, the first virtual map being generated for a first virtual character associated with the first real-world user;
present, through a user interface of the first electronic device, at least the first virtual map in a virtual game;
receive (i) second real-world telematics data from one or more sensors of a second electronic device connected to a second vehicle, and (ii) second real-world geolocation data associated with one or more prior second real-world vehicle trips made by a second real-world user;
determine, using the trained deep-learning model, one or more second real-world driving characteristics based at least in part upon second recognizable patterns of the second real-world telematics data;
determine one or more second real-world geolocation characteristics based at least in part upon the second real-world geolocation data;
generate a second virtual map based at least in part upon the one or more second real-world driving characteristics and the one or more second real-world geolocation characteristics, the second virtual map being generated for a second virtual character associated with the second real-world user; and
present, through a user interface of the second electronic device, at least the second virtual map in the virtual game;
wherein:
the first virtual map and the second virtual map are generated to be different in response to the one or more first real-world driving characteristics, the one or more second real-world driving characteristics, the one or more first real-world geolocation characteristics, and the one or more second real-world geolocation characteristics; and
the first virtual map and the second virtual map are presented at a same time in a same virtual game played by the first real user or the second real user.

11. The computing device of claim 10, wherein:
the one or more first real-world driving characteristics and the one or more second real-world driving characteristics are different;
the one or more first real-world geolocation characteristics and the one or more second real-world geolocation characteristics are same; and
the first virtual map and the second virtual map are generated to be different in response to the one or more first real-world driving characteristics and the one or more second real-world driving characteristics being different and the one or more first real-world geolocation characteristics and the one or more second real-world geolocation characteristics being the same.

12. The computing device of claim 10 wherein:
the one or more first real-world driving characteristics and the one or more second real-world driving characteristics are the same;
the one or more first real-world geolocation characteristics and the one or more second real-world geolocation characteristics are different; and
the first virtual map and the second virtual map are generated to be different in response to the one or more first real-world driving characteristics and the one or more second real-world driving characteristics being the same and the one or more first real-world geolocation characteristics and the one or more second real-world geolocation characteristics being different.

13. The computing device of claim 10, wherein:
the one or more first real-world driving characteristics and the one or more second real-world driving characteristics are different;
the one or more first real-world geolocation characteristics and the one or more second real-world geolocation characteristics are different; and
the first virtual map and the second virtual map are generated to be different in response to the one or more first real-world driving characteristics and the one or more second real-world driving characteristics being different and the one or more first real-world geolocation characteristics and the one or more second real-world geolocation characteristics being different.

14. The computing device of claim 10, wherein, the instructions, when executed by the one or more processors, further cause the one or more processors to:
receive first real-world environmental data associated with the one or more prior first real-world vehicle trips made by the first real-world user;
generate one or more first virtual environmental conditions for the first virtual character based at least in part upon the first real-world environmental data; and
apply the one or more first virtual environmental conditions to the first virtual map for the first virtual character to experience in the virtual game.

15. The computing device of claim 14, wherein, the instructions, when executed by the one or more processors, further cause the one or more processors to:
receive second real-world environmental data associated with the one or more prior second real-world vehicle trips made by the second real-world user;
generate one or more second virtual environmental conditions for the second virtual character based at least in part upon the second real-world environmental data; and
apply the one or more second virtual environmental conditions to the second virtual map for the second virtual character to experience in the virtual game.

16. The computing device of claim 15, wherein the one or more first virtual environmental conditions and the one or more second virtual environmental conditions are different.

17. A non-transitory computer-readable medium storing instructions for generating one or more virtual maps in one or more virtual games, wherein the instructions, when executed by one or more processors of a computing device, cause the computing device to:

receive (i) first real-world telematics data from one or more sensors of a first electronic device connected to a first vehicle and (ii) first real-world geolocation data associated with one or more prior first real-world vehicle trips made by a first real-world user;

determine, using a trained deep-learning model, one or more first real-world driving characteristics based at least in part upon first recognizable patterns of the first real-world telematics data;

determine one or more first real-world geolocation characteristics based at least in part upon the first real-world geolocation data;

generate a first virtual map based at least in part upon the one or more first real-world driving characteristics and the one or more first real-world geolocation characteristics, the first virtual map being generated for a first virtual character associated with the first real-world user;

present, through a user interface of the first electronic device, at least the first virtual map in a virtual game;

receive (i) second real-world telematics data from one or more sensors of a second electronic device connected to a second vehicle, and (ii) second real-world geolocation data associated with one or more prior second real-world vehicle trips made by a second real-world user;

determine, using the trained deep-learning model, one or more second real-world driving characteristics based at least in part upon second recognizable patterns of the second real-world telematics data;

determine one or more second real-world geolocation characteristics based at least in part upon the second real-world geolocation data;

generate a second virtual map based at least in part upon the one or more second real-world driving characteristics and the one or more second real-world geolocation characteristics, the second virtual map being generated for a second virtual character associated with the second real-world user; and present, through a user interface of the second electronic device, at least the second virtual map in the virtual game;

wherein:

the first virtual map and the second virtual map are generated to be different in response to the one or more first real-world driving characteristics, the one or more second real-world driving characteristics, the one or more first real-world geolocation characteristics, and the one or more second real-world geolocation characteristics; and the first virtual map and the second virtual map are presented at a same time in a same virtual game played by the first real user or the second real user.

18. The non-transitory computer-readable medium of claim 17, wherein:

the one or more first real-world driving characteristics and the one or more second real-world driving characteristics are different;

the one or more first real-world geolocation characteristics and the one or more second real-world geolocation characteristics are the same; and the first virtual map and the second virtual map are generated to be different in response to the one or more first real-world driving characteristics and the one or more second real-world driving characteristics being different and the one or more first real-world geolocation characteristics and the one or more second real-world geolocation characteristics being the same.

19. The non-transitory computer-readable medium of claim 17, wherein:

the one or more first real-world driving characteristics and the one or more second real-world driving characteristics are the same;

the one or more first real-world geolocation characteristics and the one or more second real-world geolocation characteristics are different; and the first virtual map and the second virtual map are generated to be different in response to the one or more first real-world driving characteristics and the one or more second real-world driving characteristics being the same and the one or more first real-world geolocation characteristics and the one or more second real-world geolocation characteristics being different.

20. The non-transitory computer-readable medium of claim 17, wherein:

the one or more first real-world driving characteristics and the one or more second real-world driving characteristics are different;

the one or more first real-world geolocation characteristics and the one or more second real-world geolocation characteristics are different; and the first virtual map and the second virtual map are generated to be different in response to the one or more first real-world driving characteristics and the one or more second real-world driving characteristics being different and the one or more first real-world geolocation characteristics and the one or more second real-world geolocation characteristics being different.

* * * * *